US00RE36791E

United States Patent [19]

Heller

[11] E Patent Number: Re. 36,791

[45] Reissued Date of Patent: Jul. 25, 2000

[54] LOCATION SYSTEM ADAPTED FOR USE IN MULTIPATH ENVIRONMENTS

[75] Inventor: Alan C. Heller, San Antonio, Tex.

[73] Assignee: Precision Tracking FM, Inc., Dallas, Tex.

[21] Appl. No.: 08/252,842

[22] Filed: Jun. 2, 1994

Related U.S. Patent Documents

Reissue of:

[64] Patent No.: 5,119,104
Issued: Jun. 2, 1992
Appl. No.: 07/518,802
Filed: May 4, 1990

[51] Int. Cl.[7] ..... G01S 3/02; H04L 27/30

[52] U.S. Cl. ..... 342/450; 342/463; 342/465; 375/202; 375/207; 380/34

[58] Field of Search ..... 375/1, 200–210; 380/34; 342/37, 42, 43, 44, 45, 56, 59, 450, 457, 460, 463, 464, 465, 444; 340/571–573, 825, 72

[56] References Cited

U.S. PATENT DOCUMENTS

| | | | |
|---|---|---|---|
| 3,518,674 | 6/1970 | Moorehead et al. | 342/457 |
| 3,646,580 | 2/1972 | Fuller et al. | 342/457 X |
| 3,714,573 | 1/1973 | Grossman | 375/1 X |
| 3,961,323 | 6/1976 | Hartkorn | 340/573 X |
| 4,151,407 | 4/1979 | McBride et al. . | |
| 4,275,385 | 6/1981 | White . | |
| 4,601,064 | 7/1986 | Shipley . | |
| 4,739,328 | 4/1988 | Koelle et al. | 342/44 |
| 4,818,998 | 4/1989 | Apsell et al. | 342/44 |
| 4,897,661 | 1/1990 | Hiraiwa | 342/457 |
| 4,906,854 | 3/1990 | Linwood et al. . | |
| 4,908,629 | 3/1990 | Apsell et al. | 342/457 |
| 4,914,444 | 4/1990 | Pifer et al. | 342/460 |
| 4,918,432 | 4/1990 | Pauley et al. | 340/573 |
| 4,924,211 | 5/1990 | Davies | 340/573 |
| 4,942,393 | 7/1990 | Waraksa et al. | 340/825.72 |
| 4,990,892 | 2/1991 | Guest et al. | 340/573 |
| 5,017,794 | 5/1991 | Linwood et al. | 250/551 |
| 5,027,314 | 6/1991 | Linwood et al. . | |
| 5,062,151 | 10/1991 | Shipley | 359/154 |
| 5,291,399 | 3/1994 | Chaco | 364/413.02 |
| 5,319,364 | 6/1994 | Waraksa et al. | 340/825.72 |
| 5,515,036 | 5/1996 | Waraksa et al. | 340/825.72 |

OTHER PUBLICATIONS

Great New Product: Infrared Locator, Teleconnect, Feb., 1986.

Fisher Berkeley Corporation Ektacom Brochure: Work Smarter with Smartlink.

Wescom, Inc. Advertisement, No Date.

United Identification Systems Corp. Brochure: Infra–Com Nurse Emergency Notification System (1989).

Videotape: United Identification Systems Infra–Com with Nurse Matrix (Apr. 1990).

*Primary Examiner*—Bernarr E. Gregory

*Attorney, Agent, or Firm*—Akin, Gump, Strauss, Hauer & Feld, LLP

[57] ABSTRACT

A radiolocation system for multipath environments, such as for tracking objects in a semiconductor fabrication facility (FIGS. 1a–1b), includes an array of receivers (20) distributed within the tracking area, coupled to a system processor (40) over a LAN. A TAG transmitter (30) located with each object transmits, at selected intervals, spread spectrum TAG transmissions including at least a unique TAG ID. In a high resolution embodiment, object location is accomplished by time-of-arrival (TOA) differentiation, with each receiver (FIG. 2b) including a TOA trigger circuit (64) for triggering on arrival of a TAG transmission, and a time base latching circuit (65) for latching the TOA count from an 800 MHz time base counter. In a low resolution embodiment, each receiver of the array is assigned a specific location-area, and receives TAG transmissions almost exclusively from TAGs located in that area, thereby eliminating the need for any time-of-arrival circuitry.

75 Claims, 5 Drawing Sheets

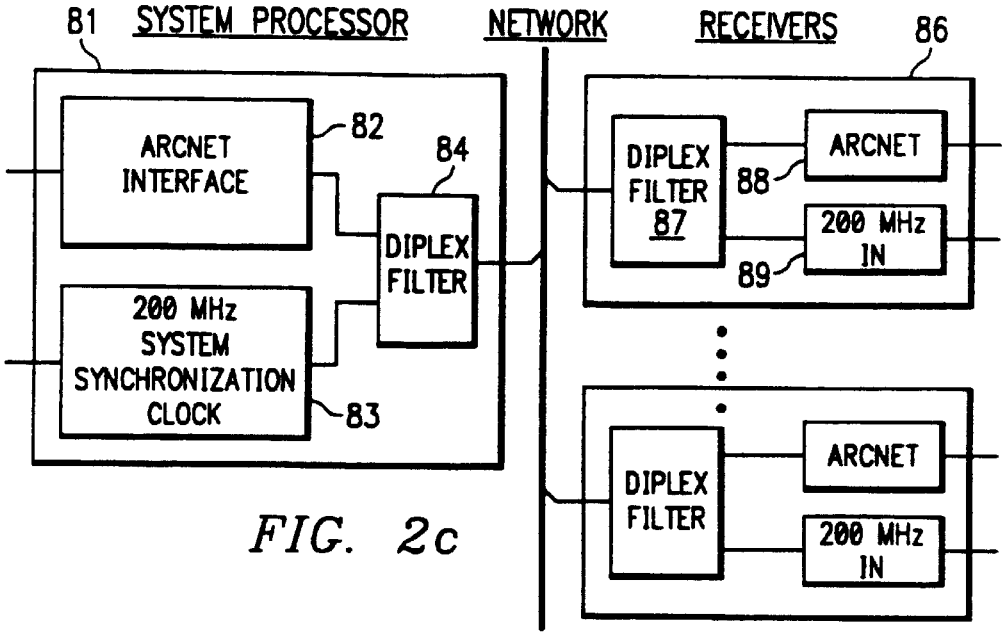
FIG. 2c
FIG. 3
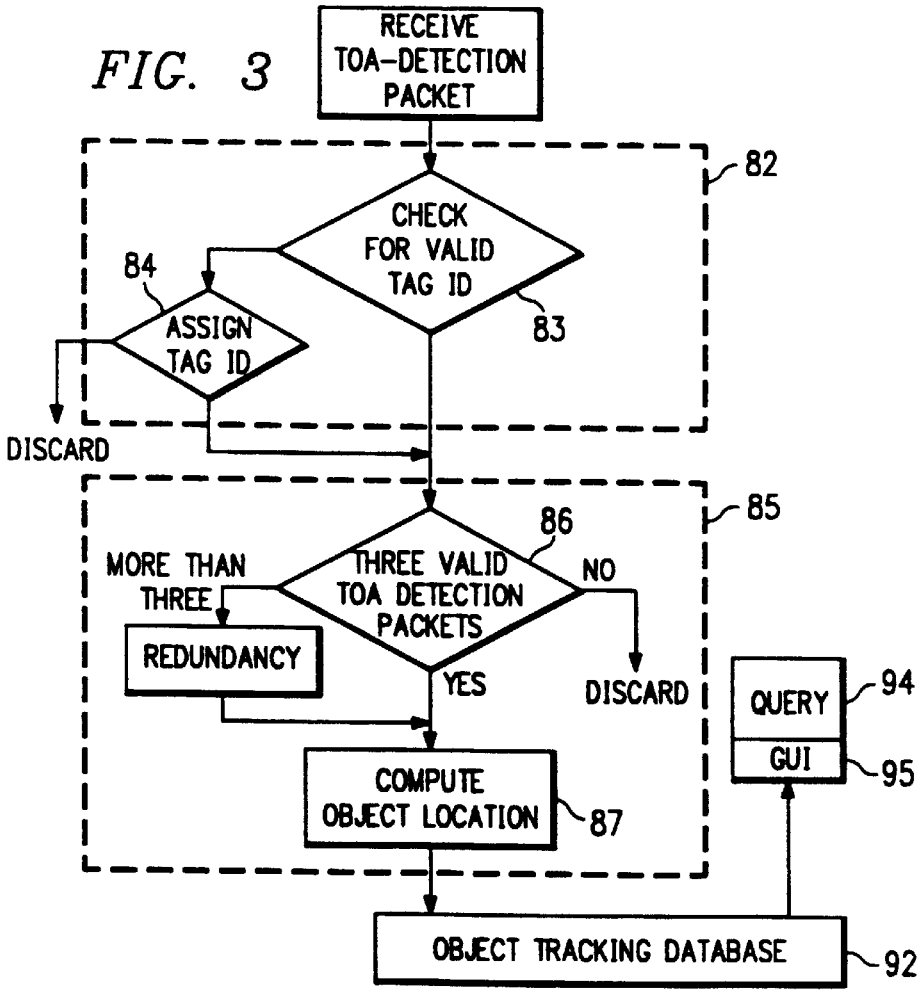

LOCATION SYSTEM ADAPTED FOR USE IN MULTIPATH ENVIRONMENTS

Matter enclosed in heavy brackets [ ] appears in the original patent but forms no part of this reissue specification; matter printed in italics indicates the additions made by reissue.

TECHNICAL FIELD OF THE INVENTION

The invention relates generally to position location systems, and more particularly relates to a radiolocation system adapted for use in an environment subject to multipath effects. In even greater particularity, the invention relates to such a system that accomplishes position location using either (a) time-of-arrival differentiation for radiolocation transmissions received at multiple receivers (high resolution), or (b) area-detection using receivers that receive radiolocation transmissions from assigned areas (low resolution).

RELATED PATENT

This patent incorporates by reference the subject matter of U.S. Pat. No. 4,864,588, titled Remote Control System, Components and Methods, which is assigned to Hillier Technologies Limited Partnership.

BACKGROUND OF THE INVENTION

Position or object location systems are finding increasing application in manufacturing and materials handling environments. For example, such systems have utility for factory automation, including such applications as tool automation, process control, robotics, autonomous guided vehicles, computer-integrated-manufacturing (CIM), and just-in-time (JIT) inventory control.

One approach to position location systems uses transmitters, or tags, attached to objects to be tracked, and an array of receivers for receiving tag transmissions throughout a tracking area. Tag transmissions can be effected by radio, ultrasonic or optical communications, using various techniques for identifying object movement or location in the near range of a receiver.

Radio communication provides a high degree of accuracy and performance superior to ultrasonics and optics in terms of: (a) range per watt of power; and (b) penetrability through opaque structures. However, a problem with radio communications in the typical business environment—which includes walls, silvered windows and other fixed structures—is that, for the frequencies of interest (i.e., above 100 MHz), random reflections introduce multipath distortions in tag transmissions arriving at a given receiver. Moreover, in such an environment, the unpredictable attenuation of transmissions passing through walls and other structures makes signal strength only marginally useful for communicating distance/location information.

Accordingly, a need exists for a position location system capable of being used to locate objects in an environment subject to the effects of multipath reflections.

SUMMARY OF THE INVENTION

The invention is a location system adapted for use in environments subject to multipath effects, implementing object location by (a) time-of-arrival differentiation using tag transmissions received at multiple receivers (high resolution embodiment), or (b) area-detection using receivers that receive tag transmissions from an assigned area (low resolution embodiment). In either the high resolution or low resolution embodiment, a radiolocation system can be implemented with spread spectrum communications for unlicensed operations.

In one aspect of the invention, the location system includes, for each object to be located within a tracking area, a TAG transmitter that transmits, at selected intervals, TAG transmissions including at least a unique TAG ID. An array of receivers is distributed within the tracking area.

For a high resolution embodiment, the array of receivers is distributed such that TAG transmissions from a given TAG transmitter located anywhere in the tracking area are received by at least three receivers (for two dimensional tracking).

Each receiver includes a time-of-arrival circuit and a data communications controller. The time-of-arrival circuit triggers in response to the arrival of a direct-path TAG transmission, providing a time-of-arrival TOA-COUNT synchronized to a system synchronization clock available at each receiver. The data communications controller is responsive to the triggering of the time-of-arrival circuit for providing a corresponding TOA-DETECTION packet including at least the TAG ID from the TAG transmission and the TOA COUNT.

A location processor receives TOA-DETECTION packets communicated from each receiver, and determines the location of a TAG (and its associated object) from at least three TOA-DETECTION packets corresponding to the TAG transmissions for that TAG received by different receivers.

For a low resolution embodiment, each receiver of the array is assigned a specific location-area, such that it receives TAG transmissions almost exclusively from TAGs located in that area. Implementing a radiolocation system based on receiver-assigned areas can be accomplished in various ways, such as by using directional antennas at the receivers, or by cooperatively selecting receiver spacing and TAG transmitter power so that TAG transmissions are received by the most proximate receiver.

Each receiver includes a data communications controller. The data communications controller in each receiver is responsive to the receipt of a TAG transmission for providing a corresponding AREA-DETECTION packet including at least the TAG ID from the TAG transmission.

A location processor receives AREA-DETECTION packets from each receiver, and determines the location of each object based on the respective receiver that received the TAG transmissions to which it is most proximate.

The location system can be implemented using spread spectrum radio communications, which allows unlicensed operations. In this aspect of the invention, each TAG transmitter includes a spread spectrum transmitter that outputs TX-packets, including at least the TAG ID, according to a spread spectrum data communications protocol. The TAG transmitters operate at a predetermined power level. Each radiolocation receiver includes a spread spectrum receiver that receives the spread spectrum TAG transmission, recovers the TAG ID, and outputs an RX-packet that includes the TAG ID.

A data communications controller at each receiver is responsive to the RX-packet to provide a DETECTION-packet, including at least the TAG ID, for communication to a location processor. The location processor receives DATA-packets from each receiver, and determines object location.

In more specific aspects of the invention, the exemplary high-resolution embodiment of a radiolocation system is used to locate objects such as wafer boxes in a semiconductor manufacturing facility. An array of radiolocation receivers is coupled to a radiolocation system processor over a LAN (local area network).

Each TAG transmitter includes, in addition to a spread spectrum transmitter, a motion detect circuit and a periodicity control circuit. The TAG transmitter is enabled for transmission only while object motion is detected by the motion detector. While the object is in motion, the TAG transmitter transmits at regular intervals determined by the periodicity control. Each TAG transmission includes a motion status (Initiated, Continuing, Stopped) in addition to TAG ID. In addition, the TAG can include means for entering other information (by an operator or otherwise) for communication to the system processor.

Each radiolocation receiver includes, in addition to a spread spectrum receiver, a TOA trigger circuit, a time base latching circuit and a programmable controller. The TOA trigger circuit triggers within the early cycles of the arrival of a TAG transmission, providing a TOA DETECT trigger. The time base latching circuit is responsive to the TOA DETECT trigger to latch the time base TOA COUNT from an 800 MHz time base counter, which is synchronized to a 200 MHz system synchronization clock provided by the system processor over the LAN. The programmable controller receives the TAG ID and motion status recovered by the spread spectrum receiver and the TOA COUNT from the time base latching circuit, and provides a TOA-DETECTION packet communicated over the LAN to the system processor.

The time-of-arrival detection circuitry in the receiver provides adjustable noise sensitivity for differentiating between TAG transmissions and random pulsed noise. The TOA trigger circuit provides the TOA-DETECT trigger when the input signal level exceeds an adjustable signal-level threshold, while the time base latching circuit signals that a valid TAG transmission has been received when the duration of the TOA-DETECT trigger exceeds a programmable signal duration threshold.

The technical advantages of the invention include the following. The location system is adaptable to use in a multipath environment, such as found in manufacturing and other business facilities, where the reception of direct-path transmissions is affected by the presence of multipath noise. Object location can be accomplished by either a high resolution approach using time-of-arrival differentiation, or a low resolution (low cost) approach using area detection by receivers configured to detect TAG transmissions from an assigned area. Using unlicensed, commercially available spread spectrum equipment facilitates discrimination between the direct-path transmissions of interest and multipath noise.

To conserve power, each TAG transmitter can include a motion detector, with TAG transmission being limited to (or concentrated in) intervals when an object is being moved. TAG transmissions can include, in addition to TAG ID, motion status and other information input by an operator or otherwise.

For the high resolution embodiment, TOA-DETECTION triggering and time base TOA COUNT latching can be separated from the spread spectrum communications function to permit the use of commercially available spread spectrum equipment. A high-speed TOA triggering circuit provides TOA-DETECTION triggering within the early cycles of the arrival of a TAG transmission. A time base latching circuit using a synchronized time base counter operating in the range of 800 MHz provides resolution on the order of 10 feet. Noise filtering optimizes time-of-arrival detection for TAG transmissions, providing adjustable signal-level and signal-duration thresholds to minimize the effects of random pulsed noise.

For a more complete understanding of the invention, and for further features and advantages, reference is now made to the following Detailed Description of an exemplary embodiment of the invention, taken in conjunction with the accompanying Drawings. Although the Detailed Description, and the Drawings, are with respect to a specific, exemplary embodiment of the invention, various changes and modifications may be suggested to one skilled in the art, and it is intended that the invention encompass such changes and modifications as fall within the scope of the appended Claims.

BRIEF DESCRIPTION OF THE DRAWINGS

FIGS. 2a–2c are functional block diagrams of a TAG transmitter, a radiolocation receiver (with time-of-arrival detection) and the LAN interface for the radiolocation system;

DETAILED DESCRIPTION OF THE INVENTION

The Detailed Description of exemplary embodiments of the radiolocation system of the invention, adapted for use in multipath environments, is organized as follows:

1. Radiolocation System—TOA Detection
   - 1.1. TAG Transmission
   - 1.2. Reception and TOA Detection
   - 1.3. LAN Communications
   - 1.4. Position Location Processing
   - 1.5. Calibration
2. Radiolocation System—Area Detection
3. Spread Spectrum Communication
4. TAG Transmitter
5. Radiolocation Receiver
   - 5.1. TOA Trigger Circuit
   - 5.2. Time-Base Latch Circuit
   - 5.2. Programmable Controller

APPENDIX A

APPENDIX B

This Detailed Description incorporates by reference the subject matter of U.S. Pat. No. 4,864,588, titled Remote Control System, Components and Methods, and assigned to Hillier Technologies Limited Partnership, together with any divisionals of that patent.

1. Radiolocation System—TOA Detection. In the exemplary embodiment, the radiolocation system is used to track and locate objects (such as wafer boxes) in in automated semiconductor fabrication facility. The radiolocation system is configured for high-resolution object location (on the order of 10 feet or less) using time-of-arrival differentiation and an 800 MHz synchronized time base clock.

Figure 1A:
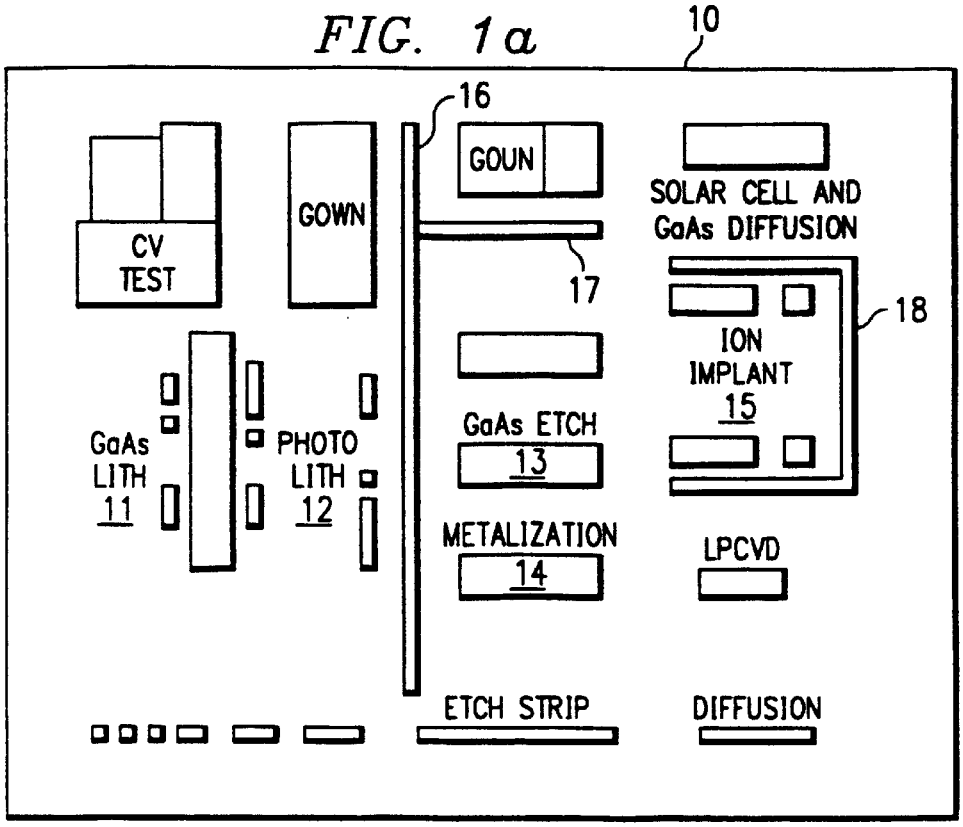
FIG. 1a illustrates a semiconductor fabrication facility as an environment containing walls and other fixed structures that cause multipath reflections.

FIG. 1a illustrates a semiconductor fabrication facility 10 with numerous segregated areas, such as GaAs Lithography Photolithography 12, GaAs Etch 13, Metalization 14 and Ion Implant 15, each enclosed by partitions or walls, including walls 16, 17 and 18.

Figure 1B:
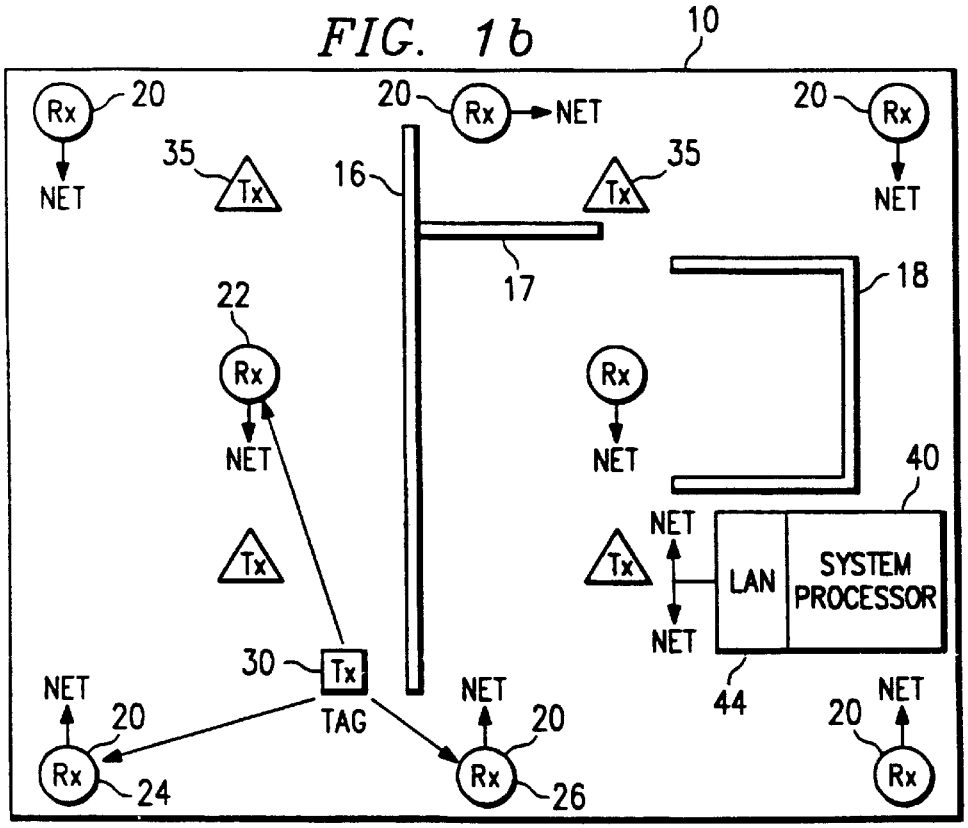
FIG. 1b illustrates an exemplary array of receivers for the radiolocation system of the invention, together with a fixed array of calibration transmitters.

FIG. 1b illustrates the fabrication facility 10 showing only the walls 16, 17 and 18. Located within the facility (in or adjacent to the ceiling) is an array of radiolocation receivers 20, including individual receivers 22, 24 and 26.

Numerous objects move within the facility, such as wafer boxes transported on conveyor systems. These objects must be tracked, and their location identified, to implement efficient automated fabrication operations.

Attached to each object to be tracked is a TAG transmitter. Each TAG transmitter associated with an object transmits TAG transmissions that are received by the receiver array. For example, the TAG transmissions from a TAG transmitter located at 30 are received by, at least, radiolocation receivers 22, 24 and 26. Each TAG transmission is a TX-packet that includes a TAG ID uniquely identifying each TAG (i.e., each object).

In addition to TAG transmitters on each object, a number of fixed-position TAG transmitters 35 are located around the facility. These TAG transmitters, which have a known position with respect to each receiver, are used for system calibration.

Each radiolocation receiver in the receiver array 20 receives TAG transmissions, and accurately detects time-of-arrival using an 800 MHz time base counter. For each TX-packet in a TAG transmission, the receiver generates corresponding TOA-DETECTION packets, which are communicated over a LAN (local area network) to a radiolocation system processor 40.

System processor 40 performs all object-location computations. In addition, the system processor 40 generates a 200 MHz system synchronization clock 42 from which the 800 MHz time base count in each receiver is derived. System processor 40 is coupled through a LAN interface 44 to the network, which is used for data communications between the system processor and the receiver array, and for providing the 200 MHz system synchronization clock.

The system processor includes object-tracking database storage, with user access to the object location information being provided by a graphics workstation through a graphical user interface.

Figure 1:
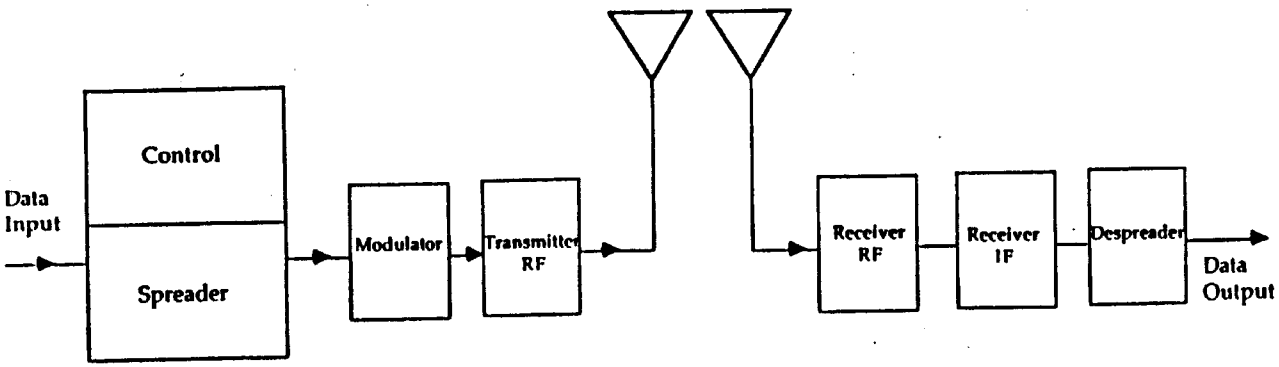

1.1. TAG Transmission. TAG transmissions between TAGs (objects) and the receiver array are implemented using spread spectrum communications in the 902–928 MHz band. In the environment illustrated in FIG. 1, radio transmissions in that frequency band are subject to multipath reflections. Using spread spectrum communications for the TAG transmissions is advantageous in separating direct-path transmissions from multipath reflections (see, Section 2).

Figure 2A:
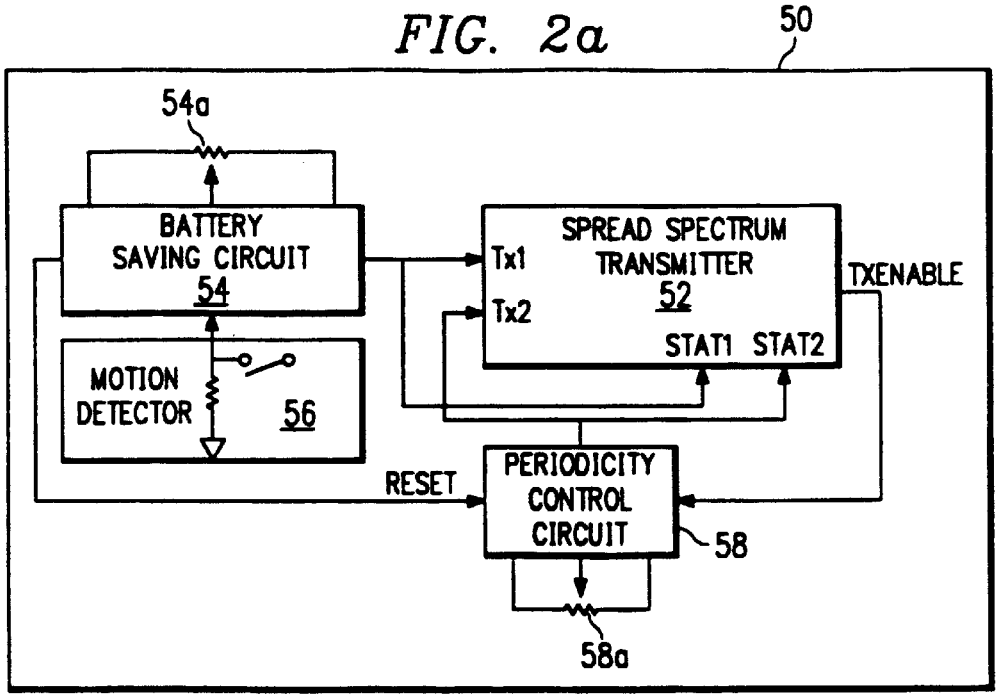

FIG. 2a is a functional block diagram of a TAG transmitter 50, which includes:

(a) a spread spectrum transmitter 52 for transmitting spread spectrum TAG transmissions (TX-packets);

(b) a battery saving circuit 54 for enabling the spread spectrum transmitter when the TAG (object) is being moved; and (c) a motion detection circuit 56 for detecting TAG (object) motion; and (d) a periodicity control circuit 58 for controlling the re-transmission interval of the spread spectrum transmitter.

For the exemplary embodiment, the TX-packet in each periodic TAG transmission includes not only the appropriate TAG ID, but also one of three motion status indications: Motion Initiated, Motion Continuing and Motion Stopped.

To conserve power and to increase the available population of TAG transmitters, each spread spectrum transmitter S2 is normally in a power-saver mode, being enabled for transmission by battery saving circuit 54 only while its associated object is being moved to a new location. Object motion is detected by motion detector 56, which provides an appropriate indication to the battery saving circuit.

In response to a motion indication, battery saving circuit 54 initiates a transmit mode by enabling spread spectrum transmitter 52 for an initial TAG transmission. The TX-packet in this initial TAG transmission includes, in addition to the TAG ID, a Motion Initiated status.

While the object remains in motion (as detected by motion detector 56), periodicity control 58 causes spread spectrum transmitter 52 to re-transmit TAG transmissions at selected intervals (such as every 15 seconds). The TX-packets in these periodic TAG re-transmissions include, in addition to the TAG ID, a Motion Continuing status.

When the object arrives at its new location and becomes stationary, motion detector 56 stops providing an object motion indication to battery saving circuit 54. After a predetermined period in which the object is stationary (such as 30 seconds), the battery saving circuit disables periodicity control 58, and causes the spread spectrum transmitter to transmit a final TAG transmission with a TX-packet including a Motion Stopped status.

The TAG transmitter remains in the non-transmitting power-saver mode until the next movement of the object. As an alternative to completely disabling TAG transmissions while an object is stationary, during such stationary times, the TAG transmitters could be programmed to transmit a low duty cycle TAG transmission that provides a No Motion status indication.

The TAG transmissions propagate through the facility, and are received by the receiver array. Because these transmissions must propagate through partitions, walls and other obstructions that introduce unpredictable levels of attenuation, signal strength at the receivers does not provide any useful information from which object location can be deduced. Moreover, these obstructions introduce multipath reflections that are also received by the receivers, albeit after the arrival of the direct-path transmission.

1.2. Reception and TOA Detection. TAG transmissions arrive at the various receivers with a time-of-arrival differential that depends upon the corresponding time-of-arrival (or path-length) differential between multiple receivers and the TAG transmitter (object), and is substantially unaffected by signal-attenuating obstructions in the path of the TAG transmission.

To implement a high resolution embodiment of the radiolocation system, this time-of-arrival differential can be used to determine object location with a high level of resolution if each receiver provides reliable and accurate time-of-arrival detection for a received TAG transmission. TOA detection requires: (a) reliable triggering on the time-of-arrival for the direct-path TAG transmission; and (b) a stable synchronized time base.

Failure to consistently and accurately trigger on arrival of the early cycles of the direct-path TAG transmission (which will arrive before any associated multipath reflections)—despite random changes in temperature, humidity and/or circuit performance—causes reliability problems that translate into errors in TOA detection, and therefore, location computation. However, even if TOA triggering is accurate, failure to achieve a stable synchronized time base (or knowledge of relative time differences) reduces the accuracy of time-of-arrival detection based on TOA triggering.

In addition, TOA triggering must be independent of the strength of the TAG transmission signal (which is subject to attenuation in the path between the object and a given receiver). Failure to trigger independent of signal strength, also known as dispersion delay, introduces time-of-arrival triggering disparities depending upon direct-path attenuation.

For the exemplary embodiment, the radiolocation system processor 40 provides a 200 MHz system synchronization clock over the LAN to each of the receivers in the array 20. At each receiver, the 200 MHz system clock is converted by conventional phase coherent frequency multiplication to an 800 MHz TOA time base clock that is synchronized with all other receivers. This approach to providing a time base for time-of-arrival detection enables the receivers to be synchronized to within about 1.25 nanoseconds, thereby allowing location resolution through TOA differentiation to within about two feet.

The selection of a 200 MHz system synchronization clock with up-conversion at each receiver to the desired 800 MHz time base clock is a design choice resulting from the selection of a specific LAN data communication system for providing the system synchronization clock (see, Section 1.3). The radiolocation system of the invention is readily adaptable to other schemes for providing a system synchronization clock for deriving an appropriate receiver time base for the desired location resolution.

Figure 2B:
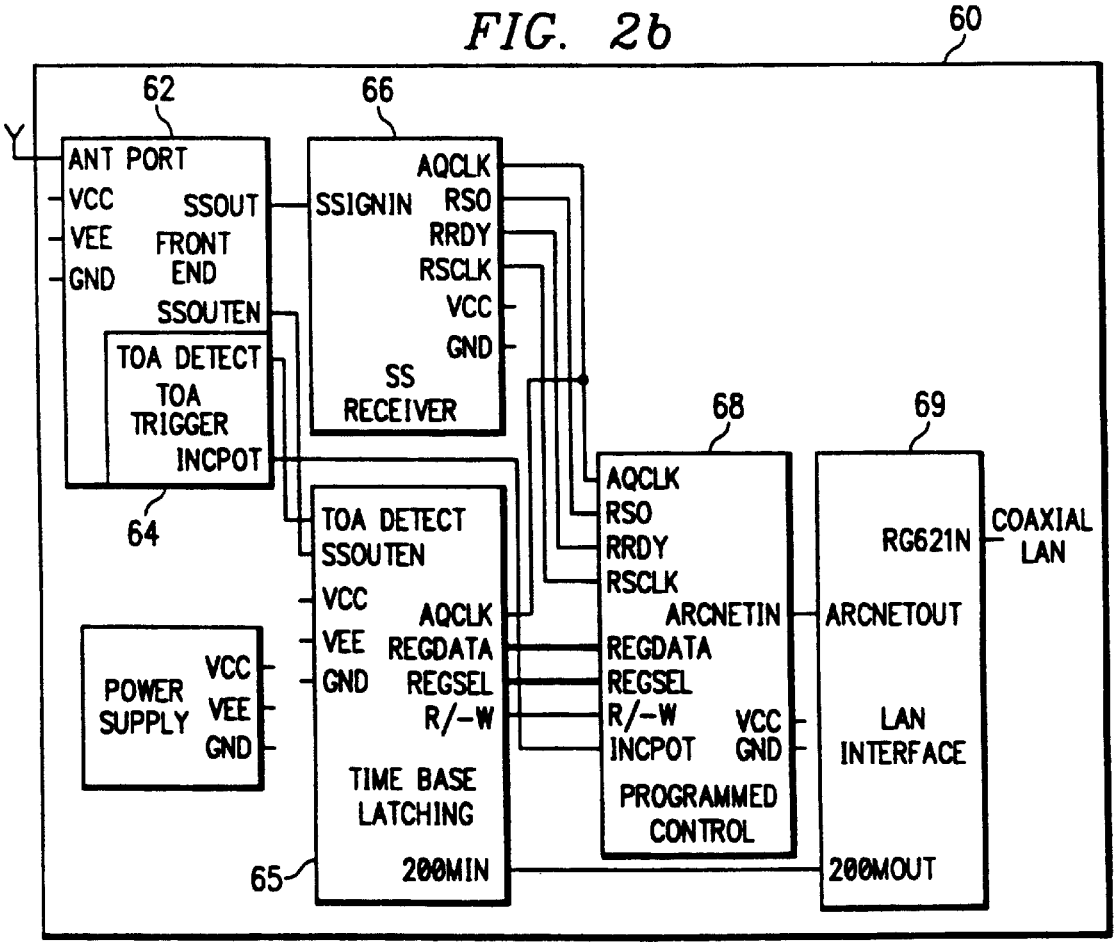

FIG. 2b is a functional block diagram of a radiolocation receiver 60, which includes:

(a) a receiver front end 62 for amplifying and conditioning the received TAG transmission (TX-packet);

(b) a TOA detect trigger 64 for detecting the arrival of the direct path TAG transmission and providing a TOA DETECT indication;

(c) a time base latching circuit 65 for latching, in response to a TOA DETECT indication, the associated time base TOA COUNT of the synchronized 800 MHz time base counter;

(d) a spread spectrum receiver 66 for receiving the TX-packet from each TAG transmission, and generating an RX-packet including the TAG ID and the motion status;

(e) a programmable controller 68 for assembling the latched TOA COUNT from the time base latching circuit, along with the recovered TAG ID and motion status, into a TOA-DETECTION packet; and (f) a network interface 69 for interfacing the communication of TOA-DETECTION packets over the LAN.

In addition, a power supply provides both TTL, ECL and radio circuitry power.

Receiver front end 62 receives each TAG transmission, and performs conventional amplification and filtering.

A received TAG transmission is applied to TOA trigger 64 for time-of-arrival triggering—the TOA trigger provides a TOA DETECT indication within the early cycles of the TAG transmission. The rapid detection of a triggering event is achievable with a high speed comparator using conventional peak energy detection in the TOA trigger.

TOA DETECT is provided to time basellatching circuit 65 as an indication of the arrival of a TAG transmission wavefront. The time base latching circuit latches the associated time base count of the 800 MHz time base clock (up-converted from the 200 MHz system synchronization clock). In addition, the time base latching circuit performs digital noise filtering to attempt to ensure that a TOA DETECT indication from TOA trigger 64 is associated with a spread spectrum TAG transmission rather than random pulsed noise.

When time base latching circuit 65 indicates the arrival of a TAG transmission, the associated TX-packet is applied to spread spectrum receiver 66. The spread spectrum receiver extracts the TAG ID and motion status from the TX-packet, and outputs an RX-packet that includes TAG ID and motion status.

For each TAG transmission, programmed controller 68 retrieves the latched time base count from time base latching circuit 65, along with the RX-packet from spread spectrum receiver 66. The programmed controller assembles this time-of-arrival information (TAG ID, motion status and time base TOA COUNT) into a TOA-DETECTION packet for communication over the LAN to the radiolocation system processor.

As an object moves from one location to another, farther from some receivers, closer to others, each radiolocation receiver detects changing time-of-arrival measurements for the associated TAG transmissions. For a given TAG transmission, the time-of-arrival detection operation at each receiver differentiates between the arrival of the direct-path TAG transmission and the subsequently-arriving multipath reflection signals, triggering on the arrival of the early cycles of the direct-path TAG transmission prior to the confluence of the multipath components.

The ability to receive a valid TAG ID despite multipath effects is enhanced by the space diversity inherent in spread spectrum communications (see, Section 2). Effectively, each receiver can be considered an element of a space diverse antenna, facilitating the rejection of multipath noise.

After TOA detection of a received direct-path TAG transmission, the TOA-DETECTION packet assembled by the programmed controller is communicated to the radiolocation system processor over the LAN.

1.3. LAN Communications. Referring to FIG. 1b, each receiver in the radiolocation receiver array is coupled over a LAN to radiolocation system processor 40 (the LAN cabling is not shown). System processor 40 continuously receives TOA-DETECTION packets (TAG ID, motion status and time base TOA COUNT) from each of the receivers as they detect TAG transmissions.

The receivers are coupled to the system processor for two independent communications operations: (a) data communication; and (b) receiver time base synchronization (providing repeatability to within a few hundreds of picoseconds). The exemplary embodiment implements these two communications operations using a single coaxial-cable based ARCNET local area network.

The ARCNET LAN uses a token passing protocol and a data transmission rate of 2.5 Mbits per second. Communication is over standard RG62 coaxial cable that will accommodate signal frequencies of up to 200 MHz without significant attenuation problems. Thus, the 200 MHz system synchronization clock can be multiplexed onto the normal ARCNET data communications traffic without any significant degradation.

FIG. 2c is a functional block diagram illustrating the LAN interface at the radiolocation system processor and the receivers. At the system processor, a LAN interface 81 includes an ARCNET interface (RIM) card 82 and a 200 MHz clock interface. A diplex filter 84 multiplexes the 200 MHz system synchronization clock 83 onto the 2.5 MHz ARCNET signal, and outputs the resulting LAN signal onto the network as normal ARCNET packet traffic.

The LAN communications from the system processor are received by the receivers of the radiolocation array. At each receiver, a LAN interface 86 includes a diplex filter 87 that demultiplexes the LAN signal to recover the 200 MHz system synchronization clock. The ARCNET packet is provided to an ARCNET interface (RIM) card 88, while the 200 MHz clock is provided through a clock interface 89 to the time base latching circuit (not shown).

Selecting a data communications network is largely a design choice. The performance requirements for the data communications operation are not particularly demanding, and could be met by a number of alternative schemes such as telephone, microwave or radio. The synchronization operation is less adaptable, being constrained by the requirement of maintaining synchronization between receivers to within a few hundreds of picoseconds—failure to maintain this synchronization equates to a loss of positional accuracy.

1.4. Position Location Processing. The radiolocation system processor receives TOA-DETECTION packets communicated over the LAN from the receivers (data acquisition), and processes the time-of-arrival data to obtain position location information (data reduction).

Figure 3:
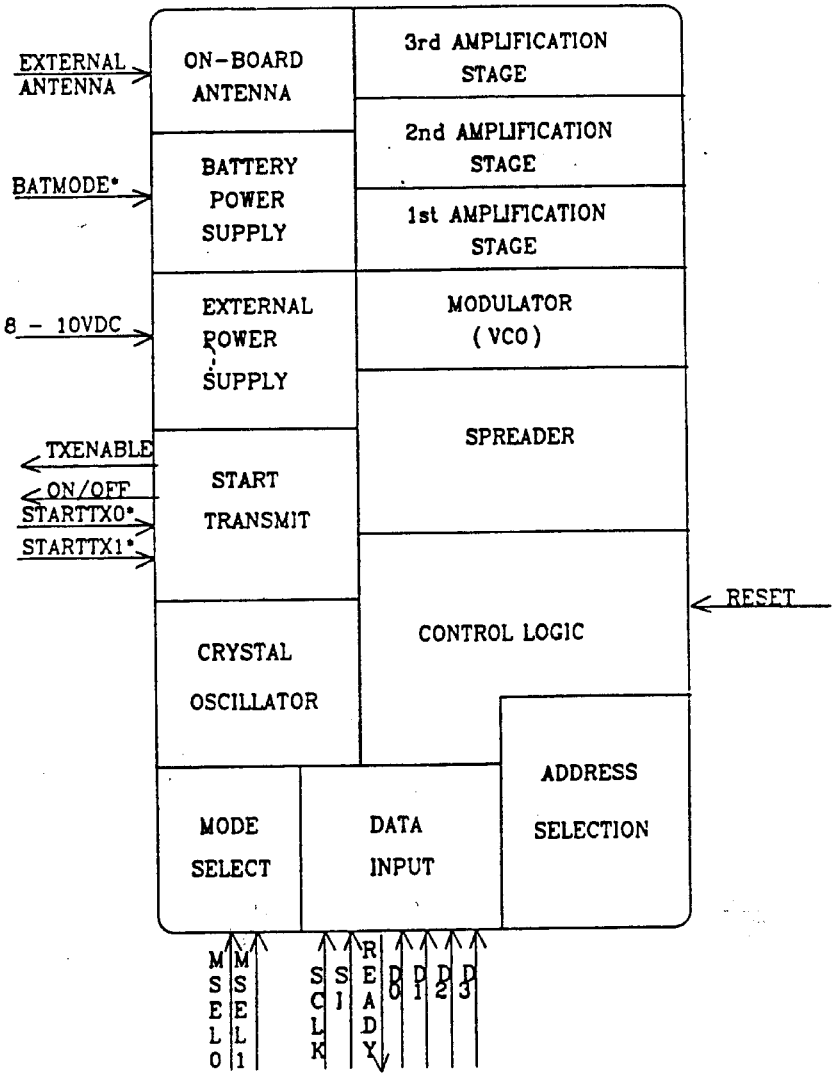
FIG. 3 diagrammatically illustrates the position location processing operation for the high resolution embodiment of the radiolocation system using time-of-arrival differentiation for object location.

FIG. 3 is a flow diagram illustrating the position location processing operation. For each received TOA-DETECTION packet (TAG ID, time base TOA COUNT, and motion status), the system processor identifies (82) the TAG (object) being moved. This operation recovers the TAG ID from a TOA-DETECTION packet, where possible, and attempts to reconcile those TOA-DETECTION packets for which the TAG ID can not be extracted. For example, multipath noise received by a receiver might prevent the receiver from recovering the TAG ID for the transmitting TAG transmitter, although the TOA data may be accurate independent of the reasons a TAG identification can not be made.

All TOA-DETECTION packets are checked (83) for valid TAG ID. Those TOA-DETECTION packets without a valid TAG ID that nevertheless arrive within a given time period, such as 1000 nanoseconds, are assigned (84) to the same TAG transmitter. Receiver redundancy, including a combination of valid TOA-DETECTION packets (i.e., valid TAG ID) and assigned TOA-DETECTION packets, enables the data reduction algorithm to determine the validity, or invalidity, of any of the assigned TOA-DETECTION.

Once the TOA-DETECTION packets associated with a given TAG transmitter have been identified or assigned (82), the time-of-arrival data for that TAG transmitter is processed (85) using conventional differential time-of-arrival algorithms to obtain object position information. For two-dimensional object tracking, if at least three TOA-DETECTION packets have been identified (86), then object position can be computed (87) using the receiver ID and time-of-arrival data (three-dimensional tracking would require at least four TOA measurements). Additional TOA-DETECTION packets represent redundant position location information that can also be used (88) by the object location algorithms.

The position location information computed from the received TOA packets is conventionally stored (92) in a fully indexed object tracking database that includes: (a) TAG ID (16 bits); (b) motion status; (c) object location; (d) location qualification vector; and (e) time.

Motion status is stored as a 4-bit quantity (sixteen combinations) that, in the exemplary embodiment indicates Motion Initiated, Motion Continuing or Motion Stopped. Examples of additional status information that could be communicated and stored include: (a) a No Motion status, transmitted at selected intervals while an object is stationary to provide an updated record of the active TAG transmitters whether or not moving, and to assist in identifying TAG transmitter failures; and (b) the status of membrane-type key depressions on the TAG transmitter (such as an operator-initiated alert), allowing key-type status to be passed to the system processor directly from the TAG transmitter or from automatic sources (such as an automatic guided vehicle).

Object location is stored in 32-bit longitude and latitude quantities. The location qualification vector represents an error radial based on the build-up of approximation calculations, TOA triggering randomness, synchronization randomness and other factors diminishing the accuracy of position location computation (to around ten feet).

The object tracking database can be queried (94) through a graphical user interface (95) using conventional database look-up and retrieval software. For the exemplary embodiment, use of a mapping database retrieval software package is recommended to permit location coordinates for any object to be posted on a map of the facility. Depending on the type of search done, the mapping database retrieval software can post to a facility map locations of a particular item, group of items, location over time, flow of items through a point in space or various combinations of such information.

1.5. Calibration. To operate the radiolocation system with TOA resolution in nanoseconds, minute changes in circuit operational parameters and propagation characteristics, such as might result from changes in temperature and humidity within the facility, must be taken into account. Such changes are accommodated through system calibration.

Referring to FIG. 2b, the radiolocation system includes calibration transmitters 35. These transmitters are installed at fixed, predetermined locations, such as by mounting at or in the ceiling of the facility in the same manner as the radiolocation receivers 20. The number and location of calibration transmitters 50 is determined principally by the need to ensure that each of the receivers in array 20 is able to receive the calibration transmission of at least three calibration transmitters.

Distributing the calibration transmitters such that each receiver receives additional calibration transmissions provides calibration redundancy to accommodate communication errors (such as loss of calibration transmitter ID). If the calibration transmitters are co-located with the receivers, the differential time-of-arrival processing of TAG transmissions from the calibration transmitters could be used to generate a survey of the receiver array.

In operation, the calibration transmitters are programmed to transmit calibration signals at predetermined intervals, such as every 100 seconds. Each calibration transmission includes the associated calibration transmitter ID.

These calibration transmissions are received by the radiolocation receivers, which detect time-of-arrival in the same manner as TAG transmissions. The receivers transmit calibration data packets (calibration transmitter ID and TOA COUNT) to system processor 40 over the LAN.

System processor 40 receives the calibration packets and computes the locations of the calibration transmitters from the time-of-arrival data using the same procedures as used in object tracking. The computed positions for each calibration transmitter, and the associated differential time-of-arrival values for the receivers, are compared to the known positions and associated differential time-of-arrival values for those transmitters—apparent positional and TOA differences are converted into new calibration coefficients for each receiver.

For each calibration interval, updated calibration coefficients are stored in the object-location database, and used to adjust the time-of-arrival data provided by each receiver in the course of normal object tracking operations.

2. Radiolocation System—Area Detection. As a low cost alternative to the high resolution embodiment of the radiolocation system using differential time-of-arrival, the radiolocation system of the invention can be implemented as a low resolution embodiment using receivers configured to detect TAG transmissions only from respective assigned areas. This embodiment differs from the high resolution embodiment described in Section 1 in two principal respects:

(a) object-location resolution is determined by the size of assigned receiver areas rather than time-of-arrival differentiation; and (b) receivers only receive TAG transmissions from TAGs transmitting within respective assigned areas, so that object location is effected when a receiver receives a TAG transmission with the TAG ID.

The low resolution embodiment offers significant cost savings by eliminating the need for time-of-arrival detection (TOA triggering and time base latching).

Referring to FIG. 2a, for the low resolution embodiment, the receivers of the radiolocation array 20 would be configured to detect TAG transmissions from TAGs located within respective object-location areas of a predetermined size (providing a predetermined object-location resolution).

For example, directional antennas could be used at selected receiver locations, with the size of the object-location area being determined by the predetermined antenna beamwidth. In this case, selecting receiver location is flexible, subject to providing coverage for an assigned object-location area.

Alternatively, the receivers could be distributed in a grid, with the size of the object-location area being determined by the predetermined spacing between receivers. In this case, object location resolution is a function of receiver spacing, with TAG transmitter power being cooperatively selected so that a TAG transmission is received by the most proximate receiver (in this configuration, receipt of a TAG transmission by more than one receiver represents a loss of object location resolution).

Referring to FIG. 2a, for the low resolution embodiment, the TAG transmitter 50 can be implemented as described in Sections 1.1 and 4 for the high resolution radiolocation embodiment. Thus, the TAG transmitter can include a spread spectrum transmitter 52 that transmits TAG transmissions only when TAG (object) motion is detected using battery saving circuit 54 and motion detector 56, with periodic re-transmissions during object motion as determined by periodicity control 58.

Again, the principal design difference would be the selection of power output from the spread spectrum transmitter—for the configuration in which object location is based on receiver spacing, TAG transmission power will be relatively low to limit range, and therefore, the likelihood that a TAG transmission will be received by more than one receiver. For example, for the high resolution embodiment (where TAG transmission reception by multiple receivers is desired), TAG transmission power might be in a range of 0.01 to 1 watt (see Section 3), while for the low power embodiment, TAG transmission power might be around one microwatt to provide an effective range of around 10 meters.

Referring to FIG. 2b, for the low resolution embodiment, the radiolocation receiver 60 can be significantly reduced in complexity and cost by eliminating those components associated with time-of-arrival detection. Thus, the only circuits that need be included are the spread spectrum receiver 66 and the programmed controller 68, although some type of receiver front end will probably be required to provide amplification and filtering.

In particular, the TOA trigger circuit 64 and the time base latching circuit 65 are no longer required to support time-of-arrival detection. Moreover, the programmable controller need not be programmed to control these circuits.

Thus, in operation, the spread spectrum receiver would operate as described in Section 3, receiving a TAG transmission from the receiver front end and recovering the TAG ID and motion status from the TX-packet, outputting an RX-packet with the recovered TAG ID and motion status. The RX-packet would be retrieved by the programmed controller.

The programmed controller would generate a corresponding AREA-DETECTION packet including TAG ID and motion status. The AREA-DETECTION packet would be communicated over the LAN to the radiolocation system processor.

The radiolocation system processor would receive AREA-DETECTION packets from the receivers of the radiolocation array, and perform object-location processing to update the object location database. For this embodiment which uses area detection rather than time-of-arrival differentiation, object location for a TAG need not be computed, but only recorded based on the receipt of AREA-DETECTION packets including the TAG ID from the receiver assigned to the area in which the TAG (object) is located.

3. Spread Spectrum Communications. For the exemplary embodiment, the radiolocation system uses spread spectrum communications under the FCC Part 15.247 regulations for unlicensed operations in the 902–928 MHz band. In addition to avoiding licensing requirements, spread spectrum communications is advantageous in differentiating direct-path TAG transmissions from the associated multipath noise, and in enabling low power operations (the maximum allowed transmitter power under Part 15.247 is one watt).

Spread spectrum transmission involves constant frequency shifts, sometimes referred to as "frequency hopping". The frequency shifts result in different angles of reflection on rough reflective surfaces, causing the multipath reflections to break into frequency components fluctuating in space.

Because the spread spectrum multipath reflections are space diverse, these components do not arrive as coherently as direct-path transmissions. This difference in coherence facilitates receiving the direct-path TAG transmission and recovering the TAG ID.

Using spread spectrum communications enables low power TAG transmitters (less than one watt) to achieve relatively long range operation by transmitting in short bursts at high peak power levels. Achieving high peak transmission power is important for the high resolution embodiment of the radiolocation system because it reduces the number of receivers required to ensure that a TAG transmission is received by at least three receivers (and usually more for the sake of redundancy).

The pulsed operation that characterizes spread spectrum communications requires noncoherent data reception. That is, unlike coherent data communications where a receiver is able to lock onto a carrier signal for demodulation, a spread spectrum receiver must acquire a synchronization lock with the incoming TAG transmission rapidly enough to ensure that the TAG ID data included in the TX-packet can be recovered.

A significant advantage of using spread spectrum communications to obtain short transmission pulses and noncoherent data reception is that battery usage is significantly lowered, albeit at the expense of some degree of data integrity or bit error rate (BER). For example, one error in $10^5$ is typical for noncoherent receiver design, while one in $10^9$ is typical in coherent receiver design.

For the high resolution embodiment of the radiolocation system of the invention, a higher error rate is tolerable because: (a) data reception is usually redundant due to receiver overlap (i.e., typically more than three receivers receive a given TAG transmission); and (b) time-of-arrival detection does not always require that a particular TAG ID be properly received since the system processor can often determine that the triggering event occurred and is associated with the TAG ID received at other receivers.

Selecting a particular spread spectrum communications system is a design choice involving primarily commercial considerations. A number of spread spectrum communications systems are commercially available. For the exemplary embodiments, the radiolocation system uses a commercially available system, SPREADEX—Short Range Spread Spectrum Wireless Control, Telemetry and Data Radio Communication System, available from Hillier Technologies Limited Partnership. This spread spectrum system is described in Appendix A (Transmitter) and Appendix B (Receiver), and in the related U.S. Pat., the disclosure of which is incorporated by reference.

Figure 4A:
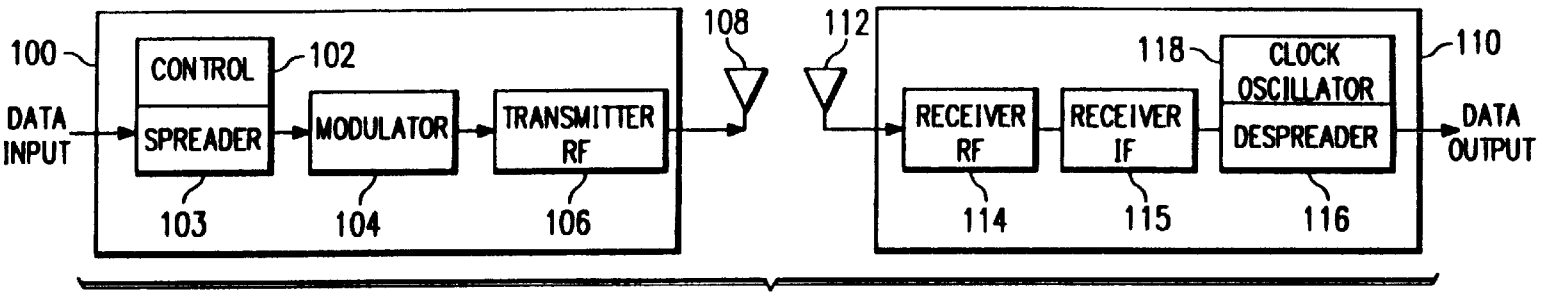
FIGS. 4a–4c functionally illustrates a spread spectrum communication system (transmitter and receiver) for use in the radiolocation system.

FIG. 4a is a functional block diagram of the SPREADEX spread spectrum communication system. The spread spectrum system includes a transmitter 100 (incorporated into each TAG transmitter) and a receiver 110 (incorporated into each receiver in the receiver array).

Spread spectrum transmitter 100 includes a control module 102 that generates the receiver master clock (using a standard digital logic crystal oscillator frequency of about 2 MHz), and provides power control, control data and operation sequencing. A spreader 103 implements an appropriate spreading (chipping) sequence to produce a spread spectrum TX-packet (TAG transmission).

The TX-packet is applied to a modulator 104 that includes shaping circuitry and a varactor diode modulating a temperature stabilized oscillator. The output of the modulator is a shaped frequency-shift-keyed signal. A final transmitter RF stage 106 provides amplification as appropriate for the selected power level (typically between 0.01 watts and the legal limit of 1 watt), together with output filtering to assure compliance with the FCC regulations on out-of-band emissions. The resulting TAG transmission is broadcast from antenna 108 (either on-board or external).

Figure 4B:
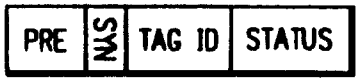

FIG. 4b shows the format of a TX-packet. It includes a preamble, a sync bit, a 16-bit TAG ID field and a 16-bit data field consisting, in the exemplary embodiment, of 12 filler bits and 4 status (data) bits. This TAG transmission packet is spread in spreader 103 by combining the packet bits with the appropriate chipping sequence. The chip clock is about 1 MHz (one half the spread spectrum transmitter crystal oscillator clock frequency), and a packet is transmitted in 619 microseconds (619 chip clock cycles), of which the first 128 microseconds are used to transmit the preamble and sync bits (i.e., prior to the TAG ID and data fields). Thus, the packet bits (including synchronization) are transmitted at about 60 Kbps, while the actual data bits are transmitted at about 52 Kbps.

Referring to FIG. 4a, spread spectrum receiver 110 includes, in addition to an antenna 112, three major stages: receiver RF front end 114, receiver IF demodulator 115 and a despreader 116. Receiver front end 114 includes a preamplifier and mixer to convert the incoming TAG transmission signal into a typical 45 MHz intermediate frequency (IF) signal. The signal is then passed to the receiver IF demodulator 115, a Motorola 13055 IF processor integrated circuit which performs demodulation.

The demodulated signal is applied to despreader 116 for despreading with a digital matched filter using analog summing and comparison. Synchronization for despreading is provided by a 2 MHz crystal oscillator 118, which should be at the same frequency as the clock in spread spectrum transmitter 100 plus or minus 400ppm to ensure acquiring synchronization lock.

The spread spectrum receiver must acquire synchronization lock to be able to recover TAG ID and status data. That is, for each TX-packet, spread spectrum receiver 110 has about 128 microseconds to acquire synchronization lock (i.e., the time allocated to the preamble and sync bits) prior to the arrival of the TAG ID and status data. If synchronization lock on the TX-packet is acquired, the TAG ID and status data are recovered, and an RX-packet is generated.

While the spread spectrum receiver is attempting to achieve synchronization lock, it is in a lock-up condition that prevents it from receiving any other signals. Thus, a design goal is to attempt to minimize the number of times a signal that is actually random pulsed noise rather than a TAG transmission is applied to the spread spectrum receiver—see Section 5.2.

Figure 4C:
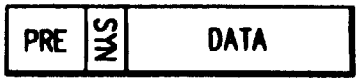

FIG. 4c shows the format of a RX-packet. It includes a preamble, a sync bit, and 32 data bits. The 32-bit data field includes a 16-bit TAG ID and a 2-bit motion status (in the exemplary embodiment, the other 14 bits are reserved).

Each RX-packet generated by spread spectrum receiver 110 in response to a TAG transmission is retrieved by the programmed controller (68 in FIG. 2b) in the radiolocation receiver, and used to assemble a corresponding TOA-DETECTION packet.

The specific implementation of a spread spectrum communication system forms no part of the present invention. A principal reason for selecting the SPREADEX system is that it is available as separate transmitter/receiver components, as well as a combined transceiver. Since the transmitter component is significantly less complex (and therefore, less expensive) than the receiver component, and since the number of TAG transmitters will typically greatly exceed the number of receivers in the radiolocation array (even in the case of the low resolution embodiment), then using just a transmitter for the TAG transmitter component greatly reduces the cost of configuring a radiolocation system.

4. TAG Transmitter. Referring to FIG. 2a, a TAG transmitter 50 performs three basic functions: (a) spread spectrum communication with TAG transmissions; (b) motion detection to enable TAG transmission; and (c) periodicity control to establish TAG transmission intervals.

Spread spectrum transmitter 52 is described in Section 2 and Appendix A, and in the related patent. For each TAG transmitter, the unique 16-bit TAG ID is provided in an address selection operation by etching or scratching 16 diode connections on the spread spectrum transmitter card.

Spread spectrum transmitter 52 is responsive to start-transmission inputs TX1 and TX2 to initiate a spread spectrum TAG transmission when either strobe line transitions active—TX1 is provided by battery saving circuit 54 and TX1 is provided by periodicity control 58. Both of these start-transmission inputs are inactive during a power-saver mode. For each TAG transmission, the spread spectrum transmitter provides a TXENABLE output that signals the end of the TX-packet transmission.

Spread spectrum transmitter 52 also receives two motion status (data) inputs STAT1 and STAT2—STAT1 is provided by battery saving circuit 54, and STAT2 is provided by periodicity control 58. Both of these STAT inputs are inactive when the TAG transmitter is in the power-saver mode (indicating no motion).

Battery saving circuit 54 is a conventional multivibrator that triggers in response to each motion (jitter) indication from motion detector 56, driving its TX1/STAT1 output line active. The reset period for the multivibrator is made adjustable, using a potentiometer 54a, within a range of 1 to 60 seconds—the adjustable reset period is selected such that, during object motion, the multivibrator is continually re-triggered before the expiration of the reset period, maintaining TX1/STAT1 active. That is, the reset period establishes the length of time after object motion ceases (as indicated by the last jitter signal from the motion detector) that spread spectrum transmitter 52 will continue periodic TAG re-transmissions.

Motion detector 56 is a conventional mercury tilt (jitter) switch that provides a motion indication signal to battery saving circuit 54 each time motion is detected. The motion detector is sensitive enough that even steady movement of an object, such as on a conveyor belt, will generally cause motion indications.

Periodicity control 58 is a conventional multivibrator that triggers in response to TXENABLE (end-of-TAG transmission) from spread spectrum transmitter 52, causing TX2/STAT2 to transition active. The multivibrator is reset, and TX2/STAT2 transitions inactive, after a reset period that is adjustable, using a potentiometer 58a, within a range of 1 to 60 seconds—the reset period establishes the length of time after a TAG transmission (as indicated by TXENABLE) that the periodicity control circuit will output a TX2 start-transmission strobe to spread spectrum transmitter 52, initiating a re-transmission.

At the commencement of object motion, battery saving circuit 54 responds to an initial motion indication from motion detector 56 to provide a TX1/STAT1 strobe, causing a TAG transmission with a Motion Initiated status.

During object motion, motion detector 56 provides motion (jitter) indications, continuously retriggering the multivibrator in batter saving circuit 54, so that TX1/STAT1 remains active. After each TAG transmission, the TXENABLE strobe from spread spectrum transmitter 52 triggers the multivibrator in periodicity control 58, which is then reset after the predetermined reset period to provide a TX2/STAT2 strobe. This action initiates periodic TAG re-transmissions with a Motion Continuing status.

When object motion ceases, motion detector 56 stops providing motion indications to trigger the multivibrator in battery saving circuit 54. After the predetermined reset period, the multivibrator is reset, and the battery saving circuit switches TX1/STAT1 inactive, and at the same time, provides a reset strobe to periodicity control 58. This action immediately resets the multivibrator, causing a TX2/STAT2 strobe to initiate one last TAG transmission with a Motion Stopped status.

For the exemplary embodiment, battery savings circuit 54 and periodicity control 58 are implemented together with a dual multivibrator integrated circuit package No. 79HC123. Potentiometer adjustments can be set based on the expected object motion and the number of TAG transmitters (objects) within transmission range of each other. Typically, a TAG transmitter will be set to retrigger every 15 seconds, and after object movement ceases, will continue to transmit 30 more seconds. The IC package typically uses under 10 microamps when the TAG transmitter is in the power-saver mode.

System design should assume that message collisions in time are inevitable, even though spread spectrum frequency hopping minimizes such collisions. To minimize message collisions, and to permit large populations of TAGs, two parameters should be optimized: (a) time of transmission should be made short; and (b) periodicity should be randomized. Failure to adequately limit transmission time causes the allowable population to decrease because of the increase in overlapping or colliding transmissions. Failure to adequately randomize periodicity causes the possibility of two TAG transmitters synchronizing, so that neither message is received.

For the exemplary embodiment, the duration of a TAG transmission (619 microseconds) is short for a radio device. If the TAG transmitters could be synchronized, then over 1,000 tags could transmit per second. Because the TAG transmitters are not synchronized, they behave in random bursts for which conventional statistical analysis can be used to minimize collisions by adjustment of periodicity for the given TAG population.

Randomness of the periodic TAG transmissions is achieved as a result of two factors. First, the initiation of motion is based upon mechanical motion, which is a random event in the context of the radiolocation system—even if multiple objects are moved together (such as by a conveyor belt), the objects are not moved in synchronicity within a synchronization window of about a millisecond window. Furthermore, the potentiometers can be used to add random periodicity. Second, the multivibrators in the battery savings and periodicity control circuit typically have a decay time subject to a Schmitt trigger voltage level that may vary from part to part by over 1 volt. Thus, the periodicity introduced by the periodicity control circuits will vary sufficiently to introduce a significant degree of randomness.

5. Radiolocation Receiver. Referring to FIG. 2b, each receiver of the array 20 performs four basic functions: (a) receiving spread spectrum communications; (b) triggering at the time-of-arrival of a TAG transmission; (c) latching the time base TOA COUNT of the 800 MHz synchronization counter in response to a TOA trigger; and (d) outputting onto the LAN TOA-DETECTION packets which include the time-of-arrival data for each TAG transmission. The highly stable 800 MHz time base clock (1.25 nanoseconds per cycle) provides an ideal distance resolution of about one foot.

TAG transmissions are received by the receiver front end 62 (ANT PORT), and applied immediately to TOA trigger 64. The TOA trigger circuit provides a TOA trigger (TOA DETECT) to time base latching circuit 65. The time base latching circuit latches the time base count of the 800 MHz time base clock, derived from the 200 MHz synchronization clock (200 MIN). In addition, the time base latching circuit performs digital noise filtering to attempt to ensure that the TOA trigger circuit is triggered by a TAG transmission rather than random pulsed noise—if a valid TAG transmission is indicated, the time base latching circuit enables (SSOUTEN) receiver front end 62 to provide the TX-packet to spread spectrum receiver 66 (SSOUT/SSIN).

Figure 5B:
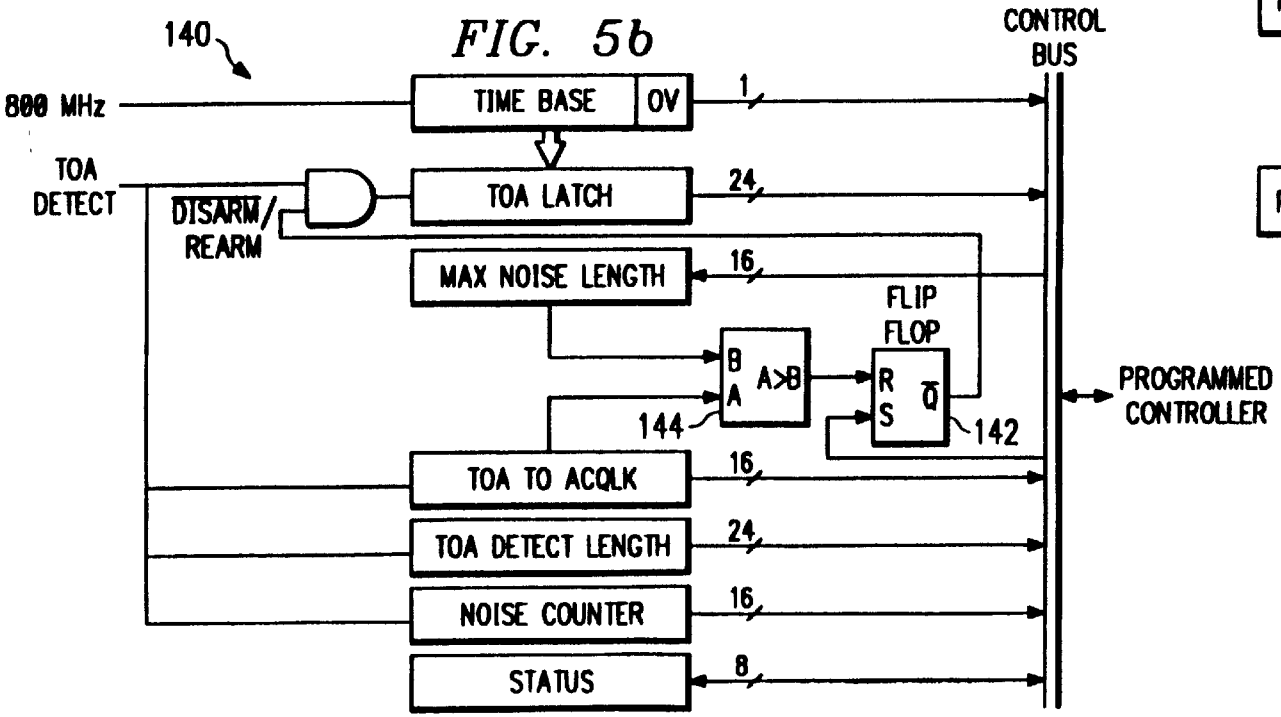
FIGS. 5a–5b schematically illustrate the time-of-arrival circuitry for the high resolution embodiment, with FIG. 5a illustrating the receiver front and the TOA detect circuit, and FIG. 5b illustrating the time base latching circuit.
Figure 5A:
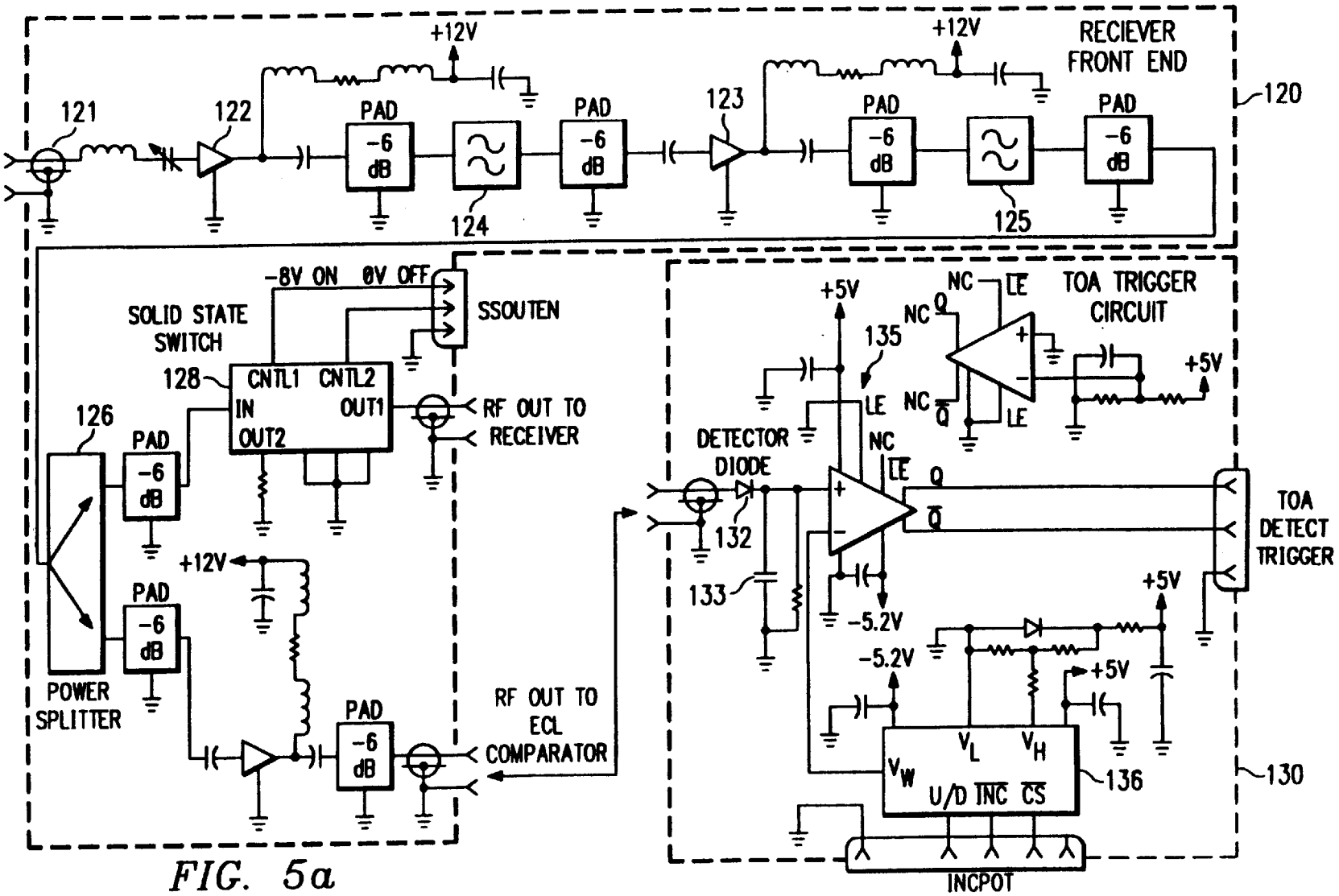

FIG. 5a is a schematic diagram of a receiver front end 120. The receiver front end receives the spread spectrum TAG transmission through antenna port 121 (ANT PORT in FIG. 2a). The radio signal is amplified in two stages by amplifiers 122 and 123, with filtering by helical filters 124 and 125. The TAG transmission signal propagates through the receiver front end with some amount of propagation delay.

After amplification and filtering, the received TAG transmission is passed to a power splitter 126 that divides the radio signal for input (a) through a solid state switch 128, to the spread spectrum receiver (66 in FIG. 2a), and (b) to a TOA trigger circuit 130 (64 in FIG. 2a). The receiver front end does not provide the TX-packet of the TAG transmission to the spread spectrum receiver until the solid state switch is enabled by SSOUTEN from the time base latch circuit (65 in FIG. 2a).

Referring to FIG. 2a, spread spectrum receiver 66 is described in Section 2 and Appendix B, and in the related patent. The receiver does not receive TX-packets from receiver front end 62 (SSOUT/SSIN) until time base latching circuit 65 decides that the received radio signal is a TAG transmission rather than random pulsed noise and provides SSOUTEN—this delay correspondingly reduces the 128 microsecond window for acquiring synchronization lock (see Sections 3 and 5.2).

Once receiver 66 has acquired synchronization lock, it provides an ACQLK signal, and proceeds to recover TAG ID and motion status from the TX-packet. The receiver then assembles a corresponding RX-packet (including TAG ID and motion status), switching RRDY active when the RX-packet is available at the serial port RSO for retrieval by the programmed controller.

Programmed controller 68 responds to RRDY active by providing an RSCLK clock signal to clock the RX-packet out of the RSO serial port.

5.1. TOA Trigger Circuit. Referring to FIG. 2a, TOA trigger circuit 64 is located on the same card as receiver front end 62, with mechanical separation being provided for signal isolation.

TOA triggering is accomplished without using mixing to obtain a down-converted intermediated frequency. While down-conversion would reduce the sensitivity required for the TOA trigger circuit, it would also reduce trigger accuracy by the period of the intermediate frequency. That is, phase differences between the transmitter oscillator and the receiver local oscillator can cause errors of up to a full IF period, leading to amplified inaccuracies.

FIG. 5a is a schematic diagram of a TOA trigger circuit 130. The TOA trigger circuit is a conventional peak-hold design—the TAG transmission signal is passed through a diode 132 to a signal-level-threshold capacitor 133, which maintains charge as a function of the highest, most recent signal.

The TOA trigger function is provided by a high speed comparator 135, which receives the TAG transmission signal and a programmable signal-level reference voltage from digital potentiometer 136. The digital potentiometer is set by a signal INCPOT from the programmed controller (see FIG. 2a).

Comparator 135 is selected for high speed and minimal dispersion characteristics, such as an FFD 96687 BQ. By minimizing dispersion, comparator output responds at the same or similar rate when driven by high power (comparator overdrive) or low power signals. The comparator reference voltage is adjusted by programmable potentiometer 136 to provide a predetermined signal-level threshold.

Upon receipt of a signal from receiver front end 120 (through power splitter 126) that exceeds the signal-level threshold set by the comparator reference voltage from potentiometer 136, comparator 135 triggers rapidly, asserting a TOA DETECT trigger signal. The TOA DETECT trigger is provided to the time base latching circuit (65 in FIG. 2a) as a possible indication of the arrival of a TAG transmission—at this point, the asserted TOA DETECT trigger may indicate a TAG transmission or random pulsed noise.

TOA DETECT remains asserted as long as the input signal remains above the comparator reference voltage—when the signal disappears beneath that predetermined signal-level threshold, either at the end of the TAG transmission or the end of the random pulsed noise, detector capacitor 133 decays, causing comparator 135 to switch and deassert TOA DETECT. Based on the length of time that the TOA DETECT trigger remains asserted, the time base latching circuit decides whether to-treat it as a TAG transmission. 5.2 Time-Base Latching Circuit. Referring to FIG. 2a, time base latching circuit receives, in addition to the TOA DETECT trigger from TOA trigger circuit 64, the 200 MHz system synchronization clock from LAN interface 69 (200 MIN), and ACQLK from spread spectrum receiver 66 (indicating that the receiver has achieved the synchronism necessary for data recovery).

Time base latching circuit is a high-speed statusizing latch circuit that performs both time base latching and digital filtering, while minimizing metastability problems associated with asynchronous latching. The circuit is configured from both high-speed ECL and TTL register sections. These registers are written and read by programmed controller 68 using REGSEL and R/-W to select a register and the type of operation, with data/parameter transfer over REGDATA.

FIG. 5b illustrates the register configuration 140 of a time base latching circuit. The registers are used for either time base latching or digital filtering operations. All registers are coupled to a Control Bus over which they may be read and/or written.

The time base latching operation is implemented using the following register designations:

| | |
|---|---|
| TIME BASE | 24-bit 800 MHz counter |
| TIME BASE OV | overflow interrupt (msbit of the TIME BASE register) |
| TOA LATCH | 24-bit latch |

These registers configured in sections using high speed ECL logic.

The TIME BASE register is an 800 MHz time base counter (non-readable) that is clocked by an 800 MHz time base clock—this clock is derived from the 200 MHz system synchronization clock provided by the radiolocation system processor by conventional phase coherent frequency multiplication. When the TOA DETECT trigger is asserted, indicating the arrival of a signal that could be a TAG transmission, the time base TOA COUNT in the TIME BASE register is immediately latched into the TOA LATCH register.

The most significant bit of the TIME BASE register is a time base overflow TIME BASE OV that outputs an interrupt onto the Control Bus—this overflow indication is latched in a STATUS register and read by the programmable controller, which maintains a total overflow count. At 800 Mhz, or a period of 1.25 nanoseconds, the 32-bit counter counts for about 21 milliseconds before overflow.

The TOA LATCH register receives a paralleled input from the TIME BASE register, and latches the time base TOA COUNT in that register when the TOA DETECT trigger is asserted. The TOA LATCH register minimizes the problem of digital latching metastability, which results from the occurrence of an asynchronous triggering event (TOA DETECT) during a window of time that the TIME BASE counter is incrementing. Such a statusizing arrangement will typically use a Johnson (or Gray code) counter as the high frequency (least significant) section(s) of the 800 MHz TIME BASE counter, reducing the number of bits in transition.

The TOA LATCH register is read section-by-section over the Control Bus by the programmed controller when the time base latching circuit has determined, in a digital filtering function, that the TOA DETECT trigger represents the arrival of a TAG transmission.

The digital filtering function is implemented using the following control and writable register designations:

| | |
|---|---|
| MAX NOISE LENGTH | 16-bit signal-duration threshold parameter |
| TOA TO ACQLK | 16-bit counter |
| TOA DETECT LENGTH | 24-bit counter |
| NOISE COUNT | 16-bit counter |
| STATUS | 8-bit latch |

These registers are configured in sections using TTL logic.

The digital filtering function defines three states of the radiolocation receiver:

(a) ARMED1—TOA DETECT trigger de-asserted, waiting for a signal that exceeds the signal-level threshold established by the comparator reference voltage;

(b) ARMED2—TOA DETECT trigger asserted, waiting for a count of MAX NOISE LENGTH to qualify the triggering signal as a TAG transmission; and (c) DISARMED—TOA DETECT asserted longer than the MAX NOISE LENGTH parameter.

When the time base latching circuit recognizes a received signal as a TAG transmission, and invokes the DISARMED state, the circuit provides (a) SSOUTEN to enable transfer of the TAG transmission (TX-packet) to the spread spectrum receiver, and (b) an interrupt to notify the programmed controller that a TAG transmission has been received and the latched time base TOA COUNT is available to be read from the TOA LATCH.

Once the DISARMED state is invoked, REARMing the radiolocation receiver (i.e., the time base latching circuit) requires a REARM command from the programmed controller (even if the TOA DETECT trigger becomes deasserted). The programmed controller provides the REARM command over the Control Bus to a flip-flop 142 that controls the TOA LATCH.

The contents of the TOA LATCH register are valid when the radiolocation receiver is put in the DISARMED state. That is, when TOA DETECT is asserted for long enough to indicate a valid TX-packet, the resulting interrupt notifies the programmed controller that the TOA LATCH register contains the time base TOA COUNT.

The radiolocation receiver is REARMed to ARMED1 either (a) from DISARMED when a valid TX-packet is detected and the least significant register sections of TOA LATCH are read, or (b) from ARMED2 when TOA DETECT is deasserted before MAX NOISE LENGTH, indicating the receipt of invalid noise.

The MAX NOISE LENGTH register is settable by the programmed controller with a value that determines the transition from the ARMED2 to the DISARMED states. That is, this register is loaded with a predetermined signal-duration threshold parameter, typically around one microsecond, that defines the duration threshold at which a received signal that causes assertion of the TOA DETECT trigger is deemed to be a TAG transmission rather than random pulsed noise.

Thus, the signal-duration threshold parameter in MAX NOISE LENGTH is used to control TOA detection sensitivity. In particular, if the MAX NOISE LENGTH parameter is too large, the spread spectrum receiver (which does not receive the TX-packet until SSOUTEN is provided after MAX NOISE LENGTH is reached) will not have enough of the 128 microsecond preamble window in which to acquire a synchronization lock (ACQLK must be achieved to recover the TAG ID).

TOA TO ACQLK is a 1 MHz 16-bit counter that measures the time between the receipt by the time base latching circuit of (a) the TOA DETECT trigger from the TOA trigger circuit, and (b) the ACQLK signal from the spread spectrum receiver. This register is used for two operations: (a) in conjunction with the MAX NOISE LENGTH register, signalling that a count of MAX NOISE LENGTH has elapsed since assertion of the TOA DETECT trigger; and (b) indicating the elapsed time after the TOA DETECT trigger for the spread spectrum receiver to achieve ACQLK (a value that can be used by the programmed controller to adjust the MAX NOISE LENGTH parameter).

When the count in TOA TO ACQLK reaches MAX NOISE LENGTH, a comparator 144 triggers to cause a transition in flip-flop 142 (DISARM/REARM). If TOA DETECT is still asserted at this time, the DISARM state is invoked, indicating a valid TAG transmission. An interrupt notifies the programmed controller that the TOA LATCH contains a valid time base TOA COUNT, which is read by the programmed controller after the TOA DETECT trigger is deasserted indicating the end of the TAG transmission.

The TOA DETECT LENGTH register is a 10 MHz 24-bit counter that measures the lapsed count during which TOA DETECT remains asserted, i.e., for the duration of the TX-packet, and is valid only in the DISARMED state. This register is resolved to approximately one microsecond, and can count beyond 619 (the standard TX-packet being 619 microseconds in duration). It can be used for confirmation that a TOA DETECT trigger that remains asserted beyond MAX NOISE LENGTH is, in fact, a valid TX-packet.

The NOISE COUNTER register provides a count of assertions of the TOA DETECT trigger since the last REARMing (i.e., since the last TOA DETECT trigger was asserted for longer than MAX NOISE LENGTH, and the associated time base TOA COUNT was read from the TOA LATCH), thereby providing a count of the number of TOA DETECT triggers that are discarded as being attributable to random pulsed noise rather than a TAG transmission. This count is used by programmed controller 68 to adjust the two noise-sensitivity thresholds—the comparator reference voltage and MAX NOISE LENGTH—to minimize TOA DETECT triggering off random pulsed noise.

In summary, the effect of the digital filtering function is to delay applying a received signal to the spread spectrum receiver until after the TOA DETECT trigger is asserted for longer than a predetermined (programmable) count of MAX NOISE LENGTH, thereby indicating that the received signal is a TAG transmission rather than random pulsed noise. This digital filtering function minimizes lock-up of the spread spectrum receiver on non-TX-packets.

Selecting the MAX NOISE LENGTH parameter depends on how fast the spread spectrum receiver can acquire synchronization lock, and the prevalence in the receiver environment of random pulsed noise. In addition to temporal digital filtering by the time base latching circuit, signal-level filtering is provided by selecting the comparator reference level for triggering the comparator in the TOA detector circuit (using INCPOT from the programmed controller).

For example, if the MAX NOISE LENGTH parameter is so short that non-TX-packets are nevertheless causing regular transitions from ARMED2 to DISARMED (indicating valid TX-packets), and if the invalid noise is of short duration, MAX NOISE LENGTH can be lengthened to exclude these noise signals.

Alternatively, if MAX NOISE LENGTH is regularly exceeded on non-TX-packets, and if the noise signal strength is low, then the comparator reference level can be increased by incrementing INCPOT to remove these interfering signals. Care must be taken against setting this comparator reference level so high as to prevent the TOA detector circuit from regularly asserting the TOA DETECT trigger for attenuated but valid TX-packets.

A recommended design approach is to maximize MAX NOISE LENGTH (maximize the signal duration threshold), and minimize the INCPOT setting for the comparator reference voltage (minimize the signal-level threshold).

5.3 Programmable Controller. Referring to FIG. 2b, programmable controller 68 is a commercially available, configurable system from INTEL (WILDCARD). It is small in size and has a relatively high density motherboard permitting the use of other peripherals. The CPU is an Intel 8088 with standard interface logic. The system comes with the following other components: (a) 256K RAM for program store; (b) 32K ROM for driver program with down-line loader; (c) peripheral controller based upon the Intel 8255; and (d) Arcnet interface.

When configured, the programmed controller is equivalent to a diskless, networked processor, standard in the industry for local area networks. The peripheral controller interfaces to (a) time base latching circuit 65 for reading and writing registers including retrieving the time base TOA COUNT from the TOA LATCH register, (b) spread spectrum receiver 66 for retrieving RX-packets (with TAG ID and motion status), and (c) TOA trigger 64 for setting the comparator reference level provided by the programmable potentiometer (136 in FIG. 5a).

At power-on, programmed controller 68 performs the following functions:

(a) Initialize the Arcnet, 8255 and 8088 to known states;

(b) Requests a down-line load from the radiolocation system processor (the network file server) over the network;

(c) Requests configuration information from the system processor specific to that receiver (as identified by its Arcnet identification address); and (d) Arms the time base latching circuit to the ARMED1 state (awaiting a TOA DETECT trigger from the TOA trigger circuit).

With the radiolocation receiver (i.e., the time base latching circuit) in the ARMED1 state, the programmed controller awaits a MAX NOISE LENGTH interrupt from the time base latching circuit—a TOA DETECT trigger (ARMED2) followed by a timeout of the MAX NOISE LENGTH counter (DISARMED)—indicating that a valid TX-packet has been received.

On receiving the MAX NOISE LENGTH interrupt, programmed controller 68 awaits deassertion of the TOA DETECT trigger (which indicates that receipt of the TAG transmission is complete), and then reads the TOA LATCH register to retrieve the time base count for the TX-packet. For statistical reasons, prior to reading the least significant register sections of the TOA LATCH, thereby effecting REARM, the programmed controller may also read the other registers of the time base latching circuit, which are still valid prior REARM.

APPENDIX A
Page 2 of 12

Hillier System Block Diagram

APPENDIX A
Page 3 of 12
Figure 2.0
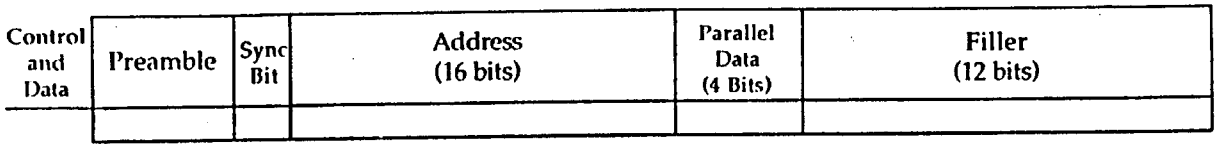
Mode 0 Packet Format
Figure 2.1
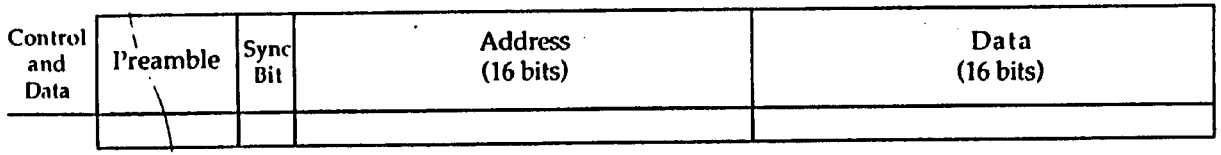
Mode 1 Packet Format
TX - Packet
Figure 2.2
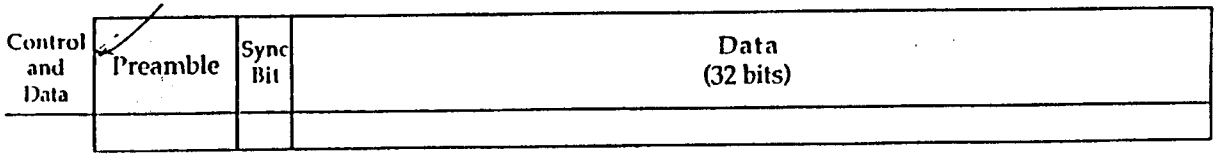
Mode 2 Packet Format
RX - Packet APPENDIX A
Page 4 of 12

The chip clock is one half the transmitter's crystal oscillator clock frequency. A packet is transmitted in 619 chip clock cycles. The standard digital logic crystal oscillator frequency is approximately 2 MHz. Thus, the raw data, including the synchronization bits, is transmitted at approximately 60,000 bits per second while the actual data bits can be transmitted at approximately 52,000 bits per second. The rate is dependent on the mode of operation. Thus, the data transmission rate is capable of providing rapid response and moderate data throughput.

2. Transmitter

The functional blocks and input/output connections of the HiTEK transmitter card are shown in figure 3. All input and output connections are 5 volt CMOS logic level compatible. A general description of each functional block and its associated input/output connections is given.

Battery Select - The BATMODE* input configures the ASIC to operate in the BATTERY mode when true (low) and in the NON-BATTERY mode when false (high). Placing a shorting jumper on JP5 ties the BATMODE* input high. In the BATTERY mode the ASIC performs additional operations by entering a SLEEP (powered down) state with the crystal oscillator stopped after each transmission and a SYSTEM WAKEUP state upon receipt of a start transmit signal.

Mode Select - inputs provide for the selection of one of three operating modes. The selection can be made by toggling the input lines or configuring on-board shorting jumpers. The transmitter formats the data packet as determined by the MSEL0 and MSEL1 inputs. Placing a shorting jumper on JP4 or JP3 ties the MSEL0 or MSEL1 inputs high respectively. They select the modes as shown below with 1 = logic high and 0 = logic low:

| | |
|---|---|
| MSEL1 = 0, MSEL0 = 0 | Mode 0 as shown in figure 2.0 |
| MSEL1 = 0, MSEL0 = 1 | Mode 1 as shown in figure 2.1 |
| MSEL1 = 1, MSEL0 = 0 | Mode 2 as shown in figure 2.2 |
| MSEL1 = 1, MSEL0 = 1 | Mode 3 is for manufacturing test |

Data Input - is for the loading of the data to be transmitted. The READY output when true (logic high) indicates that the data may be loaded in all modes. In Mode 0 the data on the 4 parallel data inputs D0, D1, D2, and D3 is sent as shown in figure 2.0 after a start to transmit signal, the parallel data is internally latched when the READY output goes low. In modes 1 and 2 a rising edge on the SCLK (shift clock) input clocks the serial input data at the SI input into the transmit data register. In Mode 1 the data register is 16 bits long while in Mode 2 it is 32 data bits long. Attempts to load data while the READY output is low will result in the loss of data. The data in the data register is transmitted after a start to transmit signal as in figures 2.1 and 2.2.

APPENDIX A
Page 5 of 12

HiTEK TRANSMITTER CARD FUNCTIONAL DIAGRAM

APPENDIX A
Page 6 of 12

Address Selection - provides for the inclusion of a 16 bit address in the transmitted data packet in operating modes 0 and 1. The data and address formats are as shown in figures 2.0 and 2.1 respectively. The HiTEK transmitter card has 16 DIP switches which select the binary address to be sent. The switch positions are sensed in a matrix format using 4 address strobe lines and 4 address sense lines.

Crystal Oscillator - provides a typical 2 MHz clock for the digital circuitry. It must be accurate to better than plus or minus 200 ppm. When operating in the battery mode, it starts to oscillate upon entering the SYSTEM WAKEUP state.

Control Logic - in the ASIC is a state machine that provides for the proper sequencing of all operations and signals. The RESET input is an analog signal which, when true (logic high), causes the transmitter ASIC to reset and enter the SLEEP state. The MSELL0 and MSEL1 inputs are internally latched when RESET goes low. The HiTEK transmitter card has components that perform a power up reset whenever power is applied.

Start Transmit - provides the internal start transmit signal when either the STARTTX0* or STARTTX1* input is enabled (transitions high to low). This causes the ASIC to enter the SYSTEM WAKEUP state when in the battery mode or enter the TXWAKEUP state when in the non-battery mode. When in the battery mode SYSTEM WAKEUP state, the crystal oscillator starts rapidly and 512 clock cycles pass before transition to the TXWAKEUP state occurs.

Upon entering the TXWAKEUP state, the TXENABLE output goes true (high) and transmission of the preamble bits starts. The TXENABLE output goes false (low) at the completion of the transmission.

The ON/OFF output goes true (high) when the STARTTX0* input starts a transmission and goes false (low) when the STARTTX1* input starts a transmission. This output is designed so that it can be tied to one of the 4 parallel data inputs and transmitted, in Mode 0 operation, if desired.

Spreader - provides for the combination of the chipping sequences with the packet bits. This accomplishes the desired spreading operation.

Modulator - uses a voltage controlled, temperature compensated LC oscillator (version 3) or SAW oscillator (version 3a) to generate the RF output signal centered at approximately 915 MHz. The spread and filtered data stream is applied to the voltage control to modulate the RF signal.

1st Amplifier Stage - provides approximately 10 dB of gain to the RF output signal coming from the modulator. This amplified signal can be jumpered at JP8A, JP8B and JP8C, via traces on the printed circuit board, to the antenna to provide the 10 milliwatt level RF output operation. The transmitter may operate at the 10 milliwatt level using the on-board batteries in the battery mode.

2nd Amplifier Stage - provides approximately 10 dB of additional gain to the RF output APPENDIX A
Page 7 of 12 signal. This generates the 100 milliwatt RF output signal level. It also can be jumpered at JP7, JP9A, JP9B and JP8C, via traces on the PCB, to the antenna to provide operation at 100 milliwatt power level. The transmitter may operate at the 100 milliwatt level using the on-board batteries in the battery mode.

3rd Amplifier Stage - provides approximately 10 dB of additional gain to the RF output signal. This generates the maximum 1 watt RF output signal level. It also can be jumpered at JP7, JP10 and JP11, via traces on the PCB, to the antenna to provide operation at the 1 watt power level. The transmitter will not operate at the 1 watt level using the on-board batteries in the battery mode. Larger capacity off board batteries or the external power supply are required.

External Power Supply - utilizes an 8 to 10 volt DC input to generate the on-board regulated 5 volt DC power supply. If operation at the 1 watt output level is required the minimum input voltage increases to 9 volts DC. Operation with an external supply is determined by positioning shorting jumpers on JP1B and JP2B.

Battery Power Supply - is provided for on the board with a 2 coin battery holder. It holds 2 lithium Matsushita CR 2330 3 volt coin batteries. Operation with the battery supply is determined by positioning Berg jumpers on JP1A and JP2A.

On-Board Antenna - is a quarter wave antenna laid out on the PCB. The PCB traces may be jumpered to use the on-board (JP12) or the external antenna (JP13).

> NOTE: All adjustable components have been preset during calibration and testing. No adjustments should be made to these components without first consulting Hillier Technology.

3. TRANSMITTER CARD PICTORIAL

Figure 4:
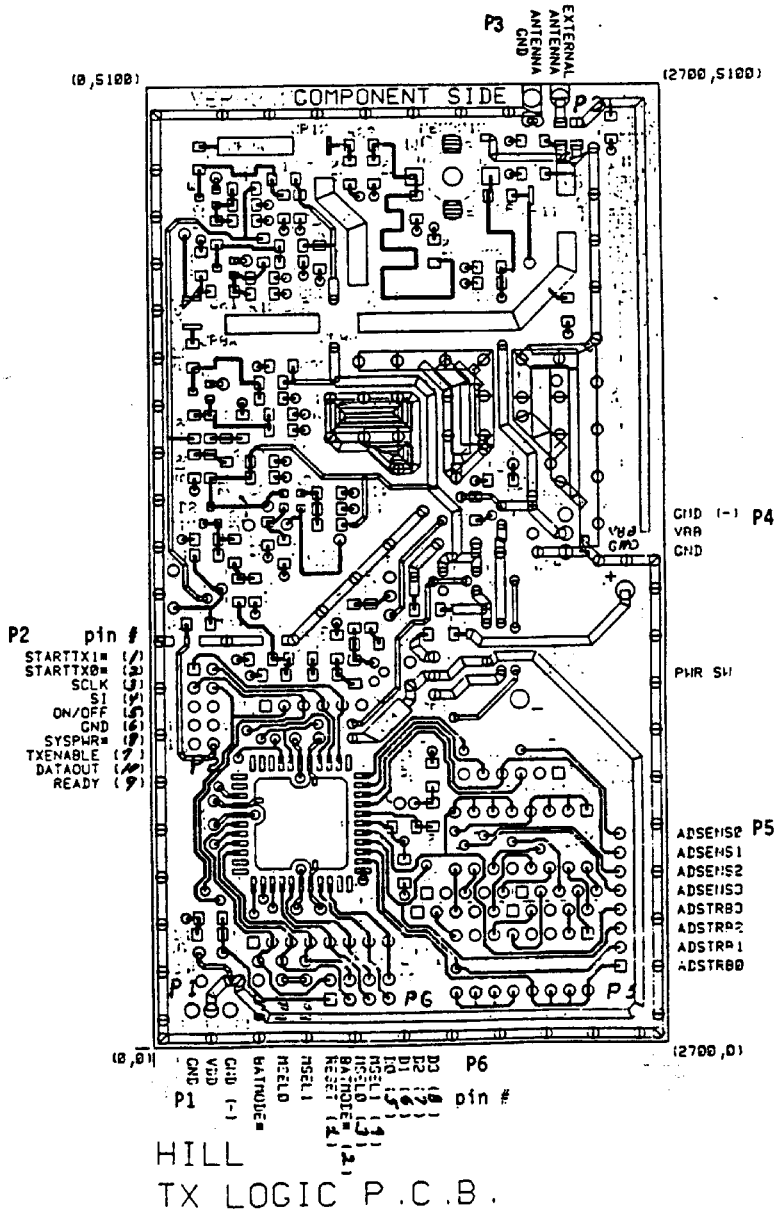

A pictorial of the transmitter card indicating component, input/output signal and jumper locations is shown in figure 4. It should be noted that many additional signals to the ones mentioned previously are labeled and brought to the edges of the PCB. This is to provide monitoring of internal signals on the transmitter card. For additional information on the mentioned signals and the signals shown on the pictorial consult HTLP engineering department.

APPENDIX A
Page 8 of 12

HILL
TX LOGIC P.C.B.

26 June 1989
Vers. 3.1 Rev. 2

APPENDIX A
Page 9 of 12

4. TRANSMITTER TIMING DIAGRAMS

Figure 5:
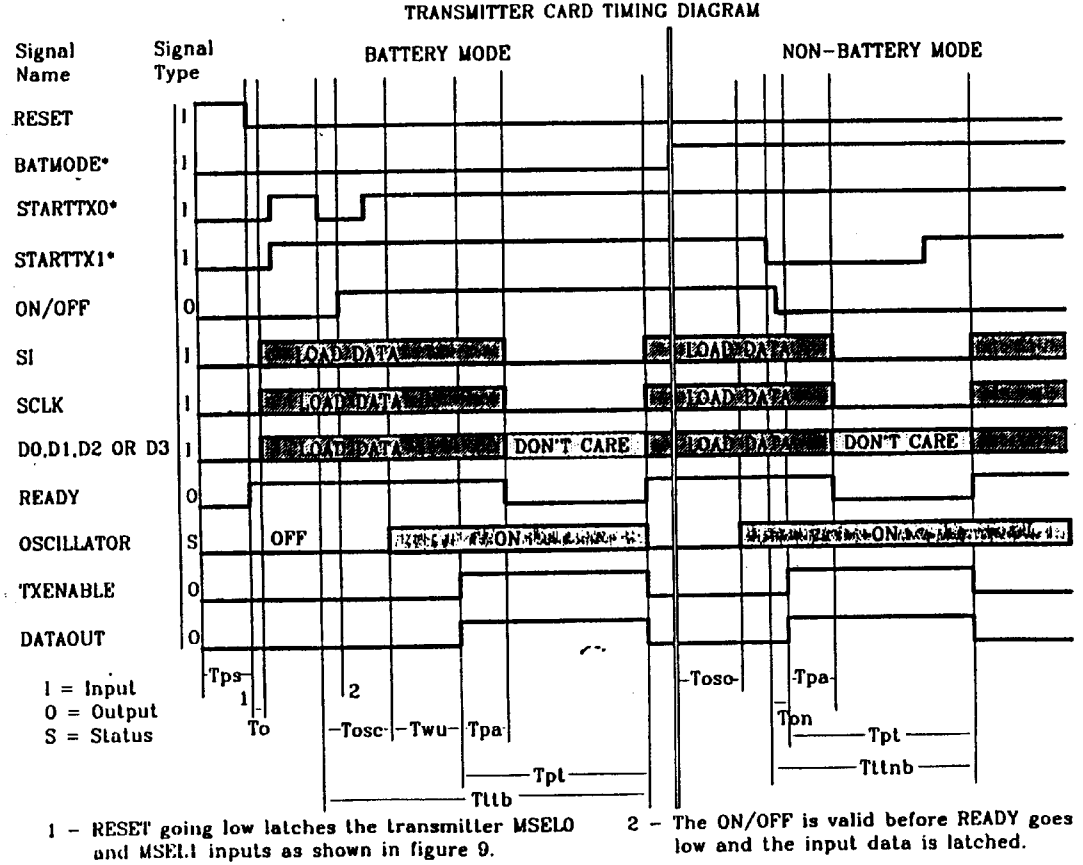
Figure 6:
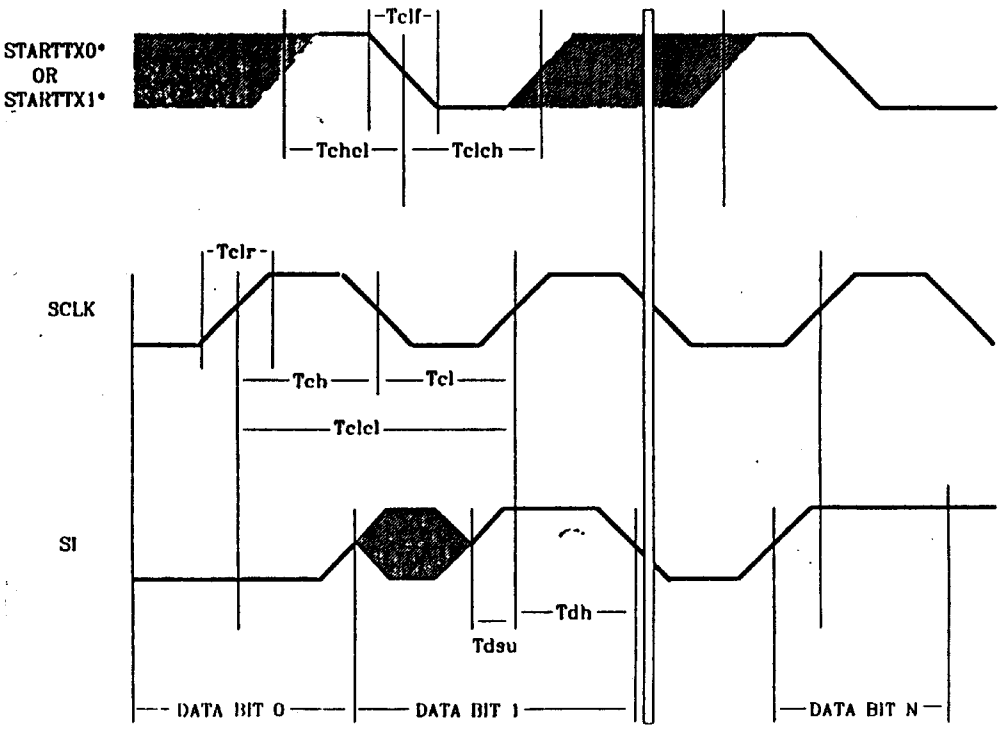

The transmitter operational timing diagrams are provided in figures 5 and 6. The operating times are specified as follows:

FIGURE 5

| SYMBOL | PARAMETER | VALUE | UNIT | |
|---|---|---|---|---|
| Clk | Digital clock frequency | 2 | MHz | typ 1 |
| Tcl | Clock cycle time = 1/Clk | .5 | us | typ |
| Tcc | Chip clock time = Tclk | 1 | us | typ |
| Tps | Automatic power-up reset | 25 | ms | typ 2 |
| Tpsmin | RESET held high, external reset | 1 | us | min |
| To | Circuit operational | 10 | ns | typ |
| Tosc | Crystal oscillator startup time | 6 | ms | typ |
| Twu | Wake up time = 512 * Tclk | 256 | us | typ |
| Tpa | Preamble transmit time = 124 * Tcc | 124 | us | typ |
| Tpt | Packet transmit time = 619 * Tcc | 619 | us | typ |
| Tttb | Total bat. transmit time=Tosc+Twu+Tpt | 6.875 | ms | typ |
| Ton | Circuit operational ≤ 1 * Tclk | .5 | us | typ |
| Tttnb | Total non-bat. transmit time=Ton+Tpt | 619.5 | us | typ 3 |

Notes:

1. All times given related to Clk are based on an assumed typical digital clock frequency of 2.00 MHz. The HiTEK version 3 PCBs use a Seiko 2.097 MHz crystal.

2. Tps is set on the HiTEK PCB's using resistor and capacitor.

3. Assumes worst case Ton time.

FIGURE 6

| SYMBOL | PARAMETER | VALUE* | UNIT | |
|---|---|---|---|---|
| Tchcl | Signal high time | 30 | ns | min |
| Tclch | Signal low time | 40 | ns | min |
| Tclf | Signal fall time | 1 | sec | max |
| Tclr | Clock rise time | 1 | us | max |
| Tch | Clock high time | 30 | ns | min |
| Tcl | Clock low time | 30 | ns | min |
| Tclcl | Clock cycle time | 60 | ns | min |
| Tdsu | Input data setup time | 20 | ns | min |
| Tdh | Input data hold time | 5 | ns | min |

* Values given are provisional.

APPENDIX A
Page 10 of 12

TRANSMITTER CARD TIMING DIAGRAM

Figure 9:
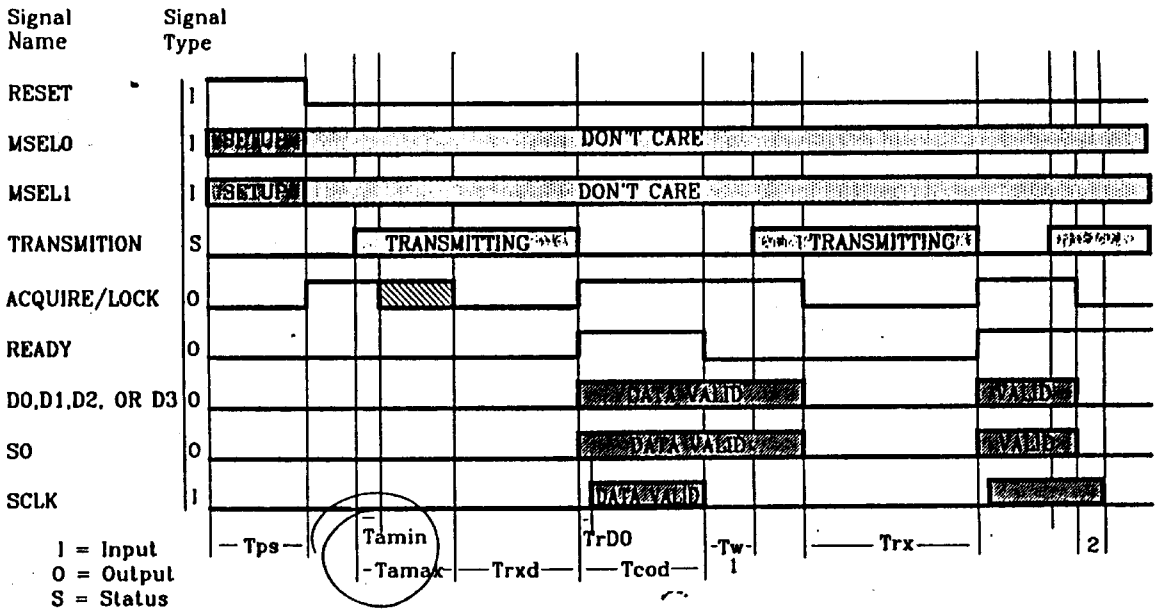

1 - RESET going low latches the transmitter MSELO and MSEL1 inputs as shown in figure 9.

2 - The ON/OFF is valid before READY goes low and the input data is latched.

APPENDIX A
Page 11 of 12

TRANSMITTER CARD CRITICAL SIGNALS TIMING DIAGRAM

APPENDIX A
Page 12 of 12

5. TRANSMITTER ELECTRICAL SPECIFICATIONS

The following specifications must not be exceeded for guaranteed performance operation.

Power supply voltage range:

| | |
|---|---|
| Battery mode (VDD) | 4.5 to 5.5 volts DC |
| Other modes (VCC) | 8 to 10 volts DC |
| | VDD generated on pcb = 5 VDC |

Power supply current range:

| | |
|---|---|
| Battery mode standby | < 10 microamps @ 20° C |
| Non-battery mode standby | < 50 milliamps |
| all modes transmitting | .01 watts- < 50 milliamps |
| | .1 watts- < 100 milliamps |
| | 1.0 watts< 250 milliamps |

Power supply regulation: Less than 10% within supply voltage range

Operating temperature range: -20° C to 60° C

Storage temperature range: -40° C to 125° C

Input signal levels (VIN): VIH = (.7 * VDD) ≤ VIN ≤ VDD volts
VIL = -.5 ≤ VIN ≤ (.3 * VDD) volts Schmitt-trigger + threshold (VT+): 2.2 volts
Schmitt-trigger - threshold (VT-): 1.3 volts Input signal timing: SI setup time relative to SCLK ≥ 50 nsec.
SI hold time relative to SCLK = 0 nsec.

Output signal levels (VO): VOH = 2.4 ≤ VO ≤ VDD volts
for 0 ≥ IOH ≥ -8 ma

VOL = VO ≤ .4 volts @ IOL ≤ 8 ma

Output signal timing: All outputs (except ON/OFF, which is asynchronous) are to occur within 100 nsec. of either the rising or falling edge of the clock.

CAUTIONS - Failure to maintain power supply within the range specified may damage components on the PCB.

Failure to maintain input signals within the range specified may damage components on the PCB.

Care should be taken in connecting the power and signal wires to the PCB in assuring that the proper polarity is maintained. Failure to do so may damage components on the PCB.

APPENDIX B
Page 1 of 9

6. RECEIVER

Figure 7:
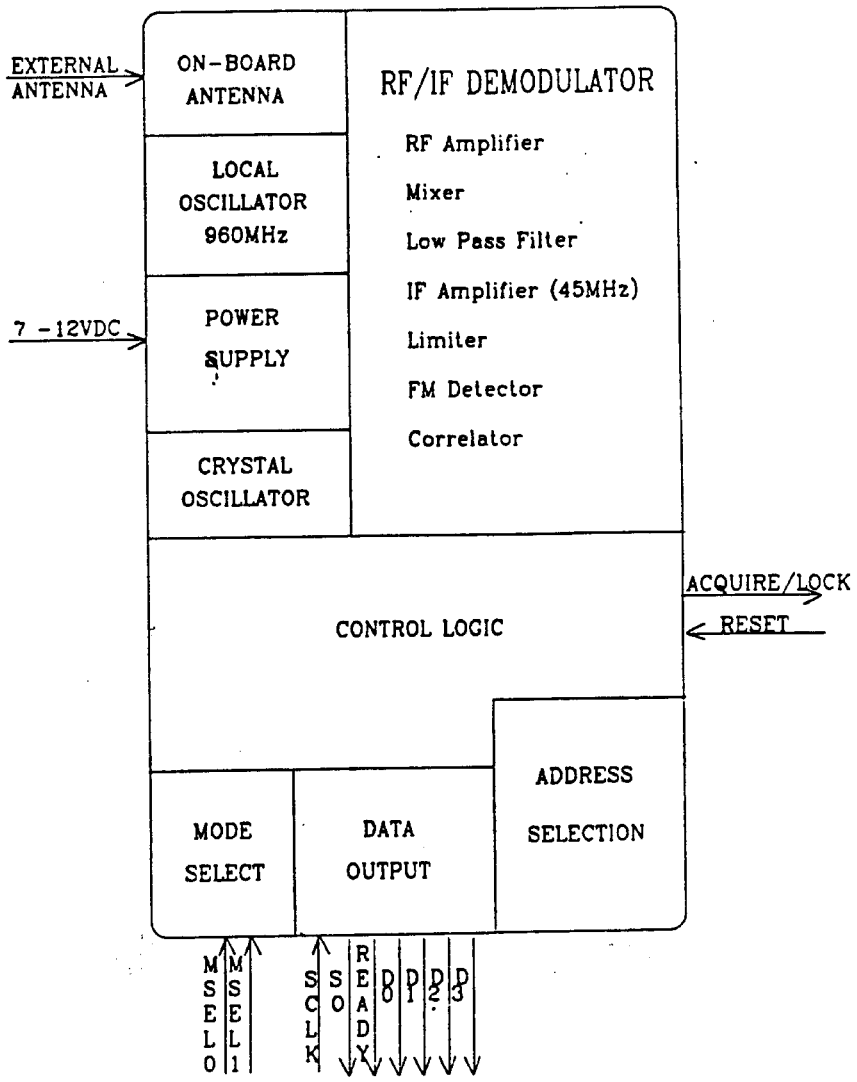

The HiTEK receiver card functional blocks and input/output connections are shown in figure 7. All input and output lines are 5 volt CMOS logic level compatible. A general description of each functional block and its associated input/output connections is given.

On-Board Antenna - is roughly a half wave antenna laid out on the PCB. The PCB traces may be jumpered to use the on-board (JP1) or the external antenna (JP2).

Local Oscillator 960 MHz - provides the local 960 MHz RF signal used by the mixer. The accuracy of the local oscillator over temperature is important to the performance of the receiver. Options are available using a temperature compensated LC oscillator (version 3) or a SAW oscillator (version 3a).

RF/IF DEMODULATOR - amplifies, mixes, filters, limits, detects, and correlates the received 915 MHz RF signal. The RF circuitry recovers the approximate 1 MHz chipped data stream. The ASIC performs the despreading operation.

Crystal Oscillator - provides a typical 2 MHz clock for the digital circuitry. It must be accurate to better than plus or minus 200 ppm. It is necessary that the transmitter and receiver crystal oscillators be at the same frequency (plus or minus 400 ppm) to ensure proper synchronization during de-spreading.

Control Logic - in the ASIC is a state machine that provides for the proper sequencing of all operations and signals. It operates at the crystal oscillator frequency. The RESET input is an analog signal which, when true (logic high), causes the receiver ASIC to reset and enter the ACQUIRE LOCK state and set the ACQUIRE/LOCK output high. The MSEL0 and MSEL1 inputs are internally latched when RESET goes low. The HiTEK receiver card has components that perform a power-up reset whenever power is applied. The ACQUIRE/LOCK output signal indicates that the ASIC is either trying to acquire synchronization with a received RF signal (high) or has acquired it (low). This signal must remain low for the entire data packet for a valid reception to have occurred. It is set true (high) when the reception is ended after a valid reception or anytime the reception is ended by the ASIC (ie. loss of synchronization or wrong address).

HiTEK RECEIVER CARD FUNCTIONAL DIAGRAM

APPENDIX B
Page 3 of 9

Mode Select - provides for the selection of one of three operating modes. The selection can be made by toggling the input lines or configuring on-board Berg jumpers. The Receiver formats the data packet as determined by the MSEL0 and MSEL1 inputs. Placing a Berg jumper on JP3 or JP4 ties the MSEL0 or MSEL1 inputs high respectively. They select the modes as shown below with 1 = logic high and 0 = logic low:

MSEL1 = 0, MSEL0 = 0 Mode 0 as shown in figure 2.0
MSEL1 = 0, MSEL0 = 1 Mode 1 as shown in figure 2.1
MSEL1 = 1, MSEL0 = 0 Mode 2 as shown in figure 2.2
MSEL1 = 1, MSEL0 = 1 Mode 3 is for manufacturing test Address Selection - provides for the monitoring of address data being received in data packets while operating in Mode 0 or 1. The HiTEK receiver card has 16 DIP switches which select the binary address to be compared against the 16 bit address field being received. If a mismatch in the transmitted address and the preset receiver address occurs the reception is terminated, ACQUIRE/LOCK is set true (high), and the receiver enters the ACQUIRE LOCK state. The switch positions are sensed in a matrix format using 4 address strobe lines and 4 address sense lines.

NOTE: The receiver can be operated in Mode 2 while the transmitter(s) is in Mode 0, 1, or 2. This provides the capability of having multiple transmitters sending with preset addresses (in Mode 0 or 1) to a single receiver (in Mode 2) that uses external circuitry to determine which transmitter sent the data from the first 16 bits of the 32 bit data received.

Data Output - provides for the reading of the data received. The READY output when true (logic high) indicates that data has been received and can be read. When READY is true, and the receiver is in Mode 0, the data on the 4 parallel data outputs D0, D1, D2, and D3 is valid. In modes 1 and 2 a rising edge on the normally low SCLK (shift clock) input clocks the next serial data bit onto the SO (serial) output line. The READY output goes low when all the data bits have been clocked out the SO output. In Mode 1 the data register is 16 bits long while in Mode 2 it is 32 data bits long. The data in the data register is only valid when both the READY and ACQUIRE/LOCK output lines are high. If the ACQUIRE/LOCK output goes low while the data is being read the data is no longer valid.

Power Supply - utilizes an 7 to 12 volt DC input to generate the on-board regulated 5 volt DC power supply.

NOTE: All adjustable components have been preset during calibration and testing. No adjustments should be made to these components without first consulting the "Spreadex Users Manual".

APPENDIX B
Page 4 of 9

7. RECEIVER PICTORIAL

Figure 8:
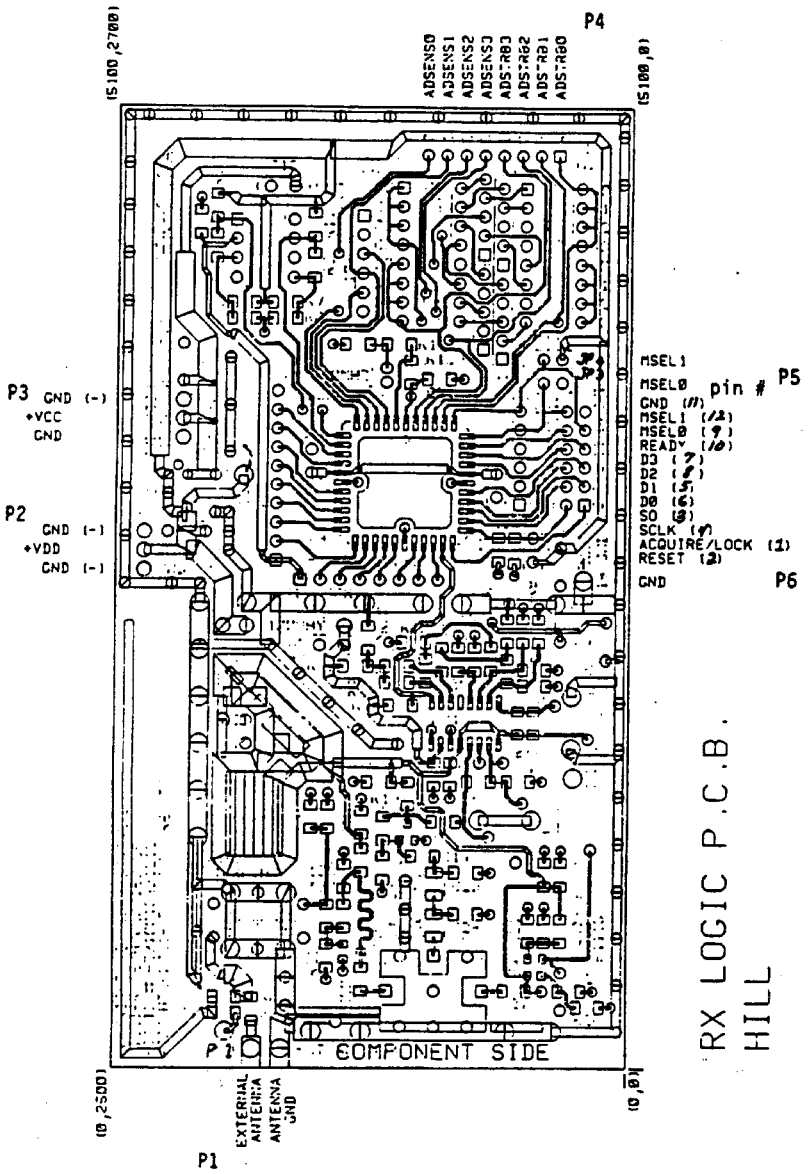

A pictorial of the transmitter card indicating component, input/output signal and jumper locations is shown in figure 8. It should be noted that many additional signals to the ones mentioned previously are labeled and brought to the edges of the PCB. This is to provide monitoring of internal signals on the transmitter card. For additional information on the mentioned signals and the signals shown on the pictorial consult the "Spreadex Users Manual".

APPENDIX B
Page 5 of 9

RX LOGIC P.C.B.
HILL

26 June 1989
Vers. 3.1 Rev. 2

8. RECEIVER TIMING DIAGRAMS

Figure 10:
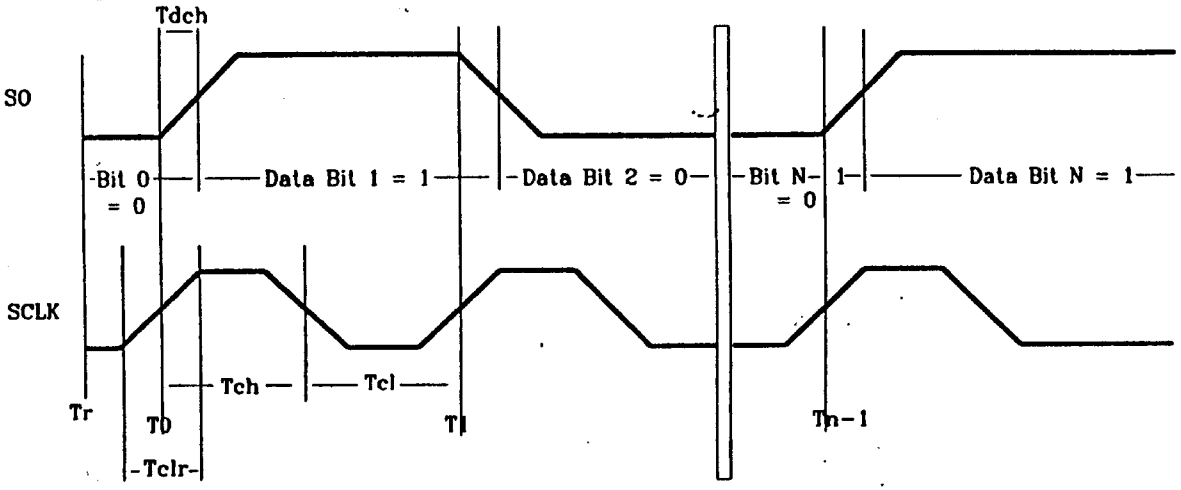

The receiver timing diagrams are provided in figures 9 and 10. The operating times are specified as follows:

FIGURE 9

| SYMBOL | PARAMETER | VALUE | UNIT | | |
|---|---|---|---|---|---|
| Clk | Digital clock frequency | 2 | MHz | typ | 1 |
| Tclk | Clock cycle time = 1/Clk | .5 | us | typ | |
| Tcc | Chip clock time = Tclk/2 | 1 | us | typ | |
| Tps | Automatic power-up reset | 25 | ms | typ | 2 |
| Tpsmin | RESET held high, external reset | 1 | us | min | |
| Tamin | Min time ACQUIRE/LOCK low = 8*Tcc | 8 | us | typ | |
| Tamax | Max time ACQUIRE/LOCK low = 124*Tcc | 124 | us | typ | |
| Trxd | Receive sync + data time=33*15*Tcc | 495 | us | typ | |
| TrD0 | Read serial data 0 bit time | Ext. Data latch time | | | |
| Tcod | Clk out serial data = 15(or 31)*SCLK cycle time | | | | 3 |
| Trx | Typical receive data time = Ta + Trxd | | | | 4 |

Notes:

1. All times given related to Clk are based on an assumed typical digital clock frequency of 2.00 MHz. The HiTEK version 3 PCBs use a Seiko 2.097 MHz crystal.

2. Tps is set on the HiTEK PCB's using resistor and capacitor.

3. Dependent on the external clocking and data latching circuitry.

4. Ta will be location/environment dependent and should be measured. Trx $\leq$ Tamin + Trxd.

FIGURE 10

| SYMBOL | PARAMETER | VALUE* | UNIT | |
|---|---|---|---|---|
| Tdch | Time till data out is valid | 80 | ns | min |
| Tclr | Clock rise time | 1 | sec | max |
| Tch | Clock high time | 40 | ns | min |
| Tcl | Clock low time | 50 | ns | min |
| Tclc | Clock cycle time | 90 | ns | min |
| Tr | Indicates READY low to high transition | | | |
| T0 | Indicates clocking out of data bit 1 | | | |
| T1 | Indicates clocking out of data bit 2 | | | |
| Tn-1 | Indicates clocking out of data bit n | | | |

* Values given are provisional.

RECEIVER CARD TIMING DIAGRAM

1 - Tw is the wait time between the completion of the data read and the start of the next transmission. The transmission may start before the data read is complete if, the data read is completed before ACQUIRE/LOCK goes low.

2 - Indicates a data overrun condition. Data is no longer valid. Any data not read before ACQUIRE/LOCK went low is lost.

APPENDIX B
Page 8 of 9

RECEIVER CARD CRITICAL SIGNALS TIMING DIAGRAM

APPENDIX B
Page 9 of 9

9. RECEIVER ELECTRICAL SPECIFICATIONS

The following specifications must not be exceeded for guaranteed performance operation.

Power supply voltage range (VCC): All modes VCC = 7 to 12 VDC

Power supply current range (IS): All modes IS $\leq$ 50 milliamps

Power supply regulation: Less than 10% within supply voltage range

Operating temperature range: -20° C to 60° C

Storage temperature range: -40° C to 125° C

Input signal levels (VIN): VIH = 3.5 VDC $\leq$ VIN $\geq$ 5 VDC
VIL = -.5 $\leq$ VIN $\geq$ 1.5 VDC Schmitt-trigger + threshold (VT+): 2.2 volts
Schmitt-trigger - threshold (VT-): 1.3 volts Output signal levels (VO): VOH = 2.4 $\leq$ VO $\leq$ VDD volts
for 0 $\geq$ IOH $\geq$ -8 ma VOL = VO $\leq$ .4 volts @ IOL $\leq$ 8 ma Output signal timing: The ACQUIRE/LOCK, READY, and ADSTRB outputs are to occur within 100 nsec. of either the rising or falling edge of the clock.

SO output time relative to SCLK $\leq$ 50 nsec

CAUTIONS - Failure to maintain power supply within the range specified may damage components on the PCB.

Failure to maintain input signals within the range specified may damage components on the PCB.

Care should be taken in connecting the power and signal wires to the PCB in assuring that the proper polarity is maintained. Failure to do so may damage components on the PCB.

APPENDIX B
Page 9 of 9

9. RECEIVER ELECTRICAL SPECIFICATIONS

The following specifications must not be exceeded for guaranteed performance operation.

Power supply voltage range (VCC): All modes VCC = 7 to 12 VDC

Power supply current range (IS): All modes IS ≤ 50 milliamps

Power supply regulation: Less than 10% within supply voltage range

Operating temperature range: -20° C to 60° C

Storage temperature range: -40° C to 125° C

Input signal levels (VIN): VIH = 3.5 VDC ≤ VIN ≥ 5 VDC
VIL = -.5 ≤ VIN ≥ 1.5 VDC Schmitt-trigger + threshold (VT+): 2.2 volts
Schmitt-trigger - threshold (VT-): 1.3 volts Output signal levels (VO): VOH = 2.4 ≤ VO ≤ VDD volts
for 0 ≥ IOH ≥ -8 ma VOL = VO ≤ .4 volts @ IOL ≤ 8 ma Output signal timing: The ACQUIRE/LOCK, READY, and ADSTRB outputs are to occur within 100 nsec. of either the rising or falling edge of the clock.

SO output time relative to SCLK ≤ 50 nsec

CAUTIONS - Failure to maintain power supply within the range specified may damage components on the PCB.

Failure to maintain input signals within the range specified may damage components on the PCB.

Care should be taken in connecting the power and signal wires to the PCB in assuring that the proper polarity is maintained. Failure to do so may damage components on the PCB.

What is claimed is:

1. A location system for locating objects within a tracking environment using time-of-arrival differentiation for electromagnetic transmissions received at multiple receivers, comprising:

for each object, a TAG transmitter for transmitting, at selected intervals, TAG transmissions that include a unique TAG ID;

an array of receivers distributed within the tracking environment such that a TAG transmission is received by at least three receivers;

each receiver including a time-of-arrival circuit and a data communications controller;

the time-of-arrival circuit is responsive to the arrival of a TAG transmission for providing a TOA count corresponding to the time-of-arrival of the most direct path for such TAG transmission, with the TOA count being synchronized to a system synchronization clock provided to each receiver;

the data communications controller is responsive to the receipt of a TAG transmission for providing a corresponding TOA-detection packet that includes the associated TAG ID and TOA count; and a location processor for receiving the TOA detection packets, and for determining the location of each TAG, and its associated object, from at least three corresponding TOA-detection packets received from different receivers.

2. The location system of claim 1, wherein spread spectrum communications is used for TAG transmissions.

3. The location system of claim 2, wherein the spread spectrum communications are in the frequency range of 900 Mhz.

4. The location system of claim 2, wherein the duration of a TAG transmission is around 600 microseconds.

5. The location system of claim 1, wherein each TAG transmission includes selected status information.

6. The location system of claim 5, wherein the selected status information is generated without operator intervention.

7. The location system of claim 1, wherein the TAG transmitter includes a motion detection circuit for detecting motion of the object, and for enabling the TAG transmitter to transmit TAG transmissions while the object is in motion.

8. The location system of claim 7, wherein TAG transmissions are transmitted only while the object is in motion and for a relatively short predetermined period of time after motion has ceased.

9. The location system of claim 8, wherein each TAG transmission includes an appropriate motion status indication.

10. The location system of claim 9, wherein each TAG transmission includes the appropriate one of at least three motion status indications: Motion Initiated, Motion Continuing, Motion Stopped.

11. The location system of claim 1, wherein the TAG transmitter includes a periodicity control circuit for causing the TAG transmitter to transmit TAG transmissions at selected intervals each time the object is being moved.

12. The location system of claim 11, wherein TAG transmissions are transmitted at relatively short intervals while the object is in motion, and at relatively long intervals while the object is stationary.

13. The location system of claim 1, wherein the time-of-arrival circuit provides an adjustable level of noise sensitivity for differentiating TAG transmissions from noise.

14. The location system of claim 13, wherein noise sensitivity is determined by a selected signal level threshold and a selected signal duration threshold.

15. The location system of claim 1, wherein the time-of-arrival circuit comprises:

a TOA trigger circuit for providing a TOA-DETECT trigger immediately upon arrival of a direct-path TAG transmission; and a time base latching circuit responsive to the TOA-DETECT trigger for latching the associated TOA count of the synchronized time base.

16. The location system of claim 15, wherein the TOA trigger circuit provides the TOA-DETECT trigger when a the signal level of a received signal exceeds a signal-level threshold, thereby indicating that the received signal is a TAG transmission.

17. The location system of claim 16, wherein the TOA trigger circuit includes a comparator for providing a TOA-DETECT trigger when the signal level of a received signal exceeds a comparator reference level.

18. The location system of claim 17, wherein the signal-level comparator reference level is adjustable.

19. The location system of claim 15, wherein the time base latching circuit indicates when the duration of the received signal exceeds a signal-duration threshold, thereby designating the received signal as a TAG transmission.

20. The location system of claim 19, wherein:

the TOA-DETECT trigger remains asserted during receipt of a TAG transmission; and the time base latching circuit provides the signal-duration indication when the duration of the TOA-DETECT trigger exceeds a selected MAX NOISE LENGTH count.

21. The location system of claim 15, wherein the time base latching circuit includes a time base counter that counts at a rate of around 800 MHz and is derived from the system synchronization signal.

22. The location system of claim 1, wherein the receivers are coupled to the location processor by a local area network, with each receiver including a LAN interface, such that the TOA detection packets are communicated to the location processor over the LAN.

23. The location system of claim 22, wherein the system synchronization clock signal is communicated to each receiver over the LAN.

24. The location system of claim further comprising:

at least one calibration transmitter, positioned at a known location, for transmitting calibration transmissions receivable by each of the receivers;

each receiver being responsive to a calibration transmission for providing a corresponding calibration TOA detection packet, including the associated time-of-arrival TOA count, to the location processor; and the location processor determines calibration coefficients from the calibration TOA detection packets and the known locations of the receivers, and uses those coefficients to calibrate location computations from TOA-detection packets associated with TAG transmissions.

25. A location system for locating objects within a tracking environment using area-detection by receivers that receive electromagnetic transmissions from assigned areas, comprising:

for each object, a TAG transmitter for transmitting, at selected intervals, TAG transmissions that include a unique TAG ID;

an array of receivers distributed within the tracking area, with each receiver being configured to receive TAG transmissions from an assigned area of a predetermined size;

each receiver including a data communications controller responsive to the receipt of a TAG transmission for providing a corresponding area-detection packet that includes the received TAG ID; and a location processor for receiving the area-detection packets, and for determining the location of each TAG, and its associated object, based on the identity of the receiver receiving the TAG transmissions for that TAG.

26. The location system of claim 25, wherein each receiver includes a directional antenna with a predetermined beamwidth, such that the receiver receives TAG transmissions originating from its assigned area.

27. The location system of claim 25, wherein:

the receivers are distributed within the tracking environment with a predetermined spacing; and the transmitter power for each TAG transmitter and the spacing between adjacent receivers are cooperatively chosen such that a TAG transmission is almost always received by a single receiver to which the TAG is most proximate.

28. The location system of claim 25, wherein spread spectrum communications is used for the TAG transmissions.

29. The location system of claim 28, wherein the spread spectrum communications are in the frequency range of 900 Mhz.

30. The location system of claim 28, wherein the duration of a TAG transmission is around 600 microseconds.

31. The location system of claim 25, wherein the TAG transmitter includes a motion detection circuit for detecting motion of the object, and for enabling the TAG transmitter to transmit TAG transmissions while the object is in motion.

32. The location system of claim 31, wherein TAG transmissions are transmitted only while the object is in motion and for a relatively short predetermined period of time after motion has ceased.

33. The location system of claim 32, wherein each TAG transmission includes an appropriate motion status indication.

34. The location system of claim 33, wherein each TAG transmission includes the appropriate one of at least three motion status indications: Motion Initiated, Motion Continuing, Motion Stopped.

35. The location system of claim 25, wherein the TAG transmitter includes a periodicity control circuit for causing the TAG transmitter to transmit TAG transmissions at selected intervals each time the object is being moved.

36. The location system of claim 35, wherein TAG transmissions are transmitted at relatively short intervals while the object is in motion, and at relatively long intervals while the object is stationary.

37. The location system of claim 25, wherein each receiver provides an adjustable level of noise sensitivity for differentiating TAG transmissions from noise.

38. The location system of claim 37, wherein noise sensitivity is determined by a selected signal level threshold and a selected signal duration threshold.

39. The location system of claim 25, wherein the receivers are coupled to the location processor by a local area network, with each receiver including a LAN interface, such that the area detection packets are communicated to the location processor over the LAN.

40. A method for locating of objects within a tracking environment using time-of-arrival differentiation for electromagnetic transmissions received at multiple receivers, comprising the steps:

for each object, transmitting, at selected intervals, TAG transmissions that include a unique TAG ID;

providing an array of receivers distributed within the tracking environment such that a TAG transmission is received by at least three receivers;

in response to the arrival of a TAG transmission at a receiver, providing a TOA count corresponding to the time-of-arrival of the most direct path for such TAG transmission, with the TOA count being synchronized to a system synchronization clock provided to each receiver;

in response to the receipt of a TAG transmission, providing a corresponding TOA-detection packet that includes the associated TAG ID and TOA count; and using the TOA-detection packets, determining the location of each TAG, and its associated object, from at least three corresponding TOA-detection packets received from different receivers.

41. The location method of claim 40, wherein the step of transmitting TAG transmissions further comprises detecting the motion of the object, and enabling TAG transmissions while the object is in motion.

42. The location method of claim 41, wherein each TAG transmission includes an appropriate motion status indication.

43. The location method of claim 40, wherein the step of transmitting TAG transmissions comprises the step of transmitting TAG transmissions at selected intervals each time an object is being moved.

44. The location method of claim 40, further comprising the step of adjusting receiver noise sensitivity using a signal level threshold and a signal duration threshold to differentiate TAG transmissions from noise.

45. The location method of claim 40, wherein the step of providing the TOA count comprises the steps:

providing a TOA-DETECT trigger immediately upon arrival of a direct-path TAG transmission; and in response to the TOA-DETECT trigger, latching the associated TOA count of a time base counter derived from the system synchronism clock.

46. The location method of claim 40, wherein the receivers are coupled to the location processor by a local area network, with each receiver including a LAN interface, such that the TOA detection packets are communicated to the location processor over the LAN.

47. The location method of claim 40, further comprising the steps:

transmitting calibration transmissions from at least one known location receivable by each of the receivers;

in response to the receipt of a calibration transmission at a receiver, providing a corresponding calibration TOA detection packet, including the associated time-of-arrival TOA count; and determining calibration coefficients from the calibration TOA detection packets and the known locations of the receivers, and using those coefficients to calibrate location computations from TOA-detection packets associated with TAG transmissions.

48. A method of locating objects within a tracking environment using area-detection by receivers that receive electromagnetic transmissions from assigned areas, comprising:

for each object, providing a TAG transmitter for transmitting, at selected intervals, TAG transmissions that include a unique TAG ID;

providing an array of receivers distributed within the tracking area, with each receiver being configured to receive TAG transmissions from an assigned area of a predetermined size;

each receiver being responsive to the receipt of a TAG transmission for providing a corresponding area-detection packet that includes the received TAG ID; and determining the location of each TAG, and its associated object, based on the identity of the receiver receiving the TAG transmissions for that TAG as represented by the area-detection packet provided by such receiver that received the TAG transmissions.

49. The method of claim 48, wherein each receiver includes a directional antenna with a predetermined beamwidth, such that the receiver receives TAG transmissions originating from its assigned area.

50. The method of claim 48, wherein:

the receivers are distributed within the tracking environment with a predetermined spacing; and the transmitter power for each TAG transmitter and the spacing between adjacent receivers are cooperatively chosen such that a TAG transmission is almost always received by a single receiver to which the TAG is most proximate.

51. The location method of claim 48, wherein the set of transmitting TAG transmissions further comprises detecting the motion of the object, and enabling TAG transmissions while the object is in motion.

52. The location method of claim 51, wherein each TAG transmission includes an appropriate motion status indication.

53. The location method of claim 48, wherein the step of transmitting TAG transmissions comprises the step of transmitting TAG transmissions at selected intervals each time an object is being moved.

54. The location method of claim 48, wherein the receivers are coupled to the location processor by a local area network, with each receiver including a LAN interface, such that the TOA detection packets are communicated to the location processor over the LAN.

*55. A transmitter including:*

*transmitter circuitry for transmitting information; and*

*a motion detection circuit for detecting motion and lack of motion of the transmitter, said motion detection circuit enabling the transmit circuitry to transmit information at first selected intervals when the transmitter is in motion and enabling the transmit circuitry to transmit information periodically at second selected intervals in response to detecting lack of motion,*

*wherein said second selected intervals are at a low duty cycle relative to said first selected intervals.*

*56. The transmitter of claim 55, wherein the information transmitted by the transmitter circuitry includes an appropriate motion status indication.*

*57. The transmitter of claim 56, wherein the motion status indication indicates one of at least three modes: Motion Initiated, Motion Continuing, Motion Stopped.*

*58. A transmitter including:*

*transmitter circuitry for transmitting information; and*

*a periodicity control circuit for causing the transmitter circuitry to transmit information at selected intervals in response to the transmitter being moved,*

*wherein the periodicity control circuit causes the transmitter circuitry to transmit at relatively short intervals while the transmitter is in motion, and at relatively long intervals while the transmitter is stationary.*

*59. A location system for locating objects within a tracking environment using area-detection by receivers that receive transmissions from assigned areas, comprising:*

*for each object, a TAG transmitter for transmitting, at selected intervals, TAG transmissions that include a unique TAG ID, each said TAG transmitter further including a motion detection circuit for detecting motion of the object, and for enabling the TAG transmitter to transmit TAG transmissions while the object is in motion;*

*an array of receivers distributed within the tracking area, with each receiver being configured to receive TAG transmissions from an assigned area of a predetermined size;*

*each receiver including a data communications controller responsive to the receipt of a TAG transmission for providing a corresponding area-detection packet that includes the received TAG ID; and*

*a location processor for receiving the area-detection packets, and for determining the location of each TAG, and its associated object, based on the identity of the receiver receiving the TAG transmissions for that TAG.*

*60. The location system of claim 59, wherein TAG transmissions are transmitted only while the object is in motion and for a relatively short predetermined period of time after motion has ceased.*

*61. The location system of claim 60, wherein each TAG transmission includes an appropriate motion status indication.*

*62. The location system of claim 61, wherein each TAG transmission includes the appropriate one of at least three motion status indications: Motion Initiated, Motion Continuing, Motion Stopped.*

*63. The location system of claim 59, wherein the TAG transmitter includes a periodicity control circuit for causing the TAG transmitter to transmit TAG transmissions at selected intervals each time the object is being moved.*

*64. The location system of claim 63, wherein TAG transmissions are transmitted at relatively short intervals while the object is in motion, and at relatively long intervals while the object is stationary.*

*65. A location system for locating objects within a tracking environment using area-detection by receivers that receive transmissions from assigned areas, comprising:*

*for each object, a TAG transmitter for transmitting, at selected intervals, TAG transmissions that include a unique TAG ID;*

*an array of receivers distributed within the tracking area, with each receiver being configured to receive TAG transmissions from an assigned area of a predetermined size;*

*each receiver including a data communications controller responsive to the receipt of a TAG transmission for providing a corresponding area-detection packet that includes the received TAG ID;*

*a location processor for receiving the area-detection packets, and for determining the location of each TAG, and its associated object, based on the identity of the receiver receiving the TAG transmissions for that TAG; and*

*wherein each receiver provides an adjustable level of noise sensitivity for differentiating TAG transmissions from noise.*

*66. A location system for locating objects within a tracking environment using area-detection by receivers that receive transmissions from assigned areas, comprising:*

*for each object, a TAG transmitter for transmitting at selected intervals, TAG transmissions that include a unique TAG ID;*

*an array of receivers distributed within the tracking area, with each receiver being configured to receive TAG transmissions from an assigned area of a predetermined size;*

*each receiver including a data communications controller responsive to the receipt of a TAG transmission for providing a corresponding area-detection packet that includes the received TAG ID;*

*a location processor for receiving the area-detection packets, and for determining the location of each TAG, and its associated object, based on the identity of the receiver receiving the TAG transmissions for that TAG; and*

*a local area network, said array of receivers being coupled to the location processor by said local area network, with each receiver including a LAN interface, such that the area detection packets are communicated to the location processor over said LAN.*

*67. A method of locating objects within a tracking environment using area-detection by receivers that receive transmissions from assigned areas, comprising:*

*for each object, providing a TAG transmitter for transmitting, at selected intervals, TAG transmissions that include a unique TAG ID;*

*providing an array of receivers distributed within the tracking area, with each receiver being configured to receive TAG transmissions from an assigned area of a predetermined size;*

*each receiver being responsive to the receipt of a TAG transmission for providing a corresponding area-detection packet that includes the received TAG ID;*

*determining the location of each TAG, and its associated object, based on the identity of the receiver receiving the TAG transmissions for that TAG as represented by the area-detection packet provided by such receiver that received the TAG transmissions;*

*said receivers being distributed within the tracking environment with a predetermined spacing; and*

*the transmitter power for each TAG transmitter and the spacing between adjacent receivers being cooperatively chosen such that a TAG transmission is almost always received by a single receiver to which the TAG is most proximate.*

*68. A method of locating objects within a tracking environment using area-detection by receivers that receive transmissions from assigned areas, comprising:*

*for each object, providing a TAG transmitter for transmitting, at selected intervals, TAG transmissions that include a unique TAG ID;*

*providing an array of receivers distributed within the tracking area, with each receiver being configured to receive TAG transmissions from an assigned area of a predetermined size;*

*each receiver being responsive to the receipt of a TAG transmission for providing a corresponding area-detection packet that includes the received TAG ID;*

*determining the location of each TAG, and its associated object, based on the identity of the receiver receiving the TAG transmissions for that TAG as represented by the area-detection packet provided by such receiver that received the TAG transmissions; and*

*wherein the set of transmitting TAG transmissions further comprises detecting the motion of the object, and enabling TAG transmissions while the object is in motion.*

*69. The location method of claim 68, wherein each TAG transmission includes an appropriate motion status indication.*

*70. A method of locating objects within a tracking environment using area-detection by receivers that receive transmissions from assigned areas, comprising:*

*for each object, providing a TAG transmitter for transmitting, at selected intervals, TAG transmissions that include a unique TAG ID;*

*providing an array of receivers distributed within the tracking area, with each receiver being configured to receive TAG transmissions from an assigned area of a predetermined size;*

*each receiver being responsive to the receipt of a TAG transmission for providing a corresponding area-detection packet that includes the received TAG ID;*

*determining the location of each TAG, and its associated object, based on the identity of the receiver receiving the TAG transmissions for that TAG as represented by the area-detection packet provided by such receiver that received the TAG transmissions; and*

*wherein the step of transmitting TAG transmissions comprises the step of transmitting TAG transmissions at selected intervals each time an object is being moved.*

*71. A method of locating objects within a tracking environment using area-detection by receivers that receive transmissions from assigned areas, comprising:*

*for each object, providing a TAG transmitter for transmitting, at selected intervals, TAG transmissions that include a unique TAG ID;*

*providing an array of receivers distributed within the tracking area, with each receiver being configured to receive TAG transmissions from an assigned area of a predetermined size;*

*each receiver being responsive to the receipt of a TAG transmission for providing a corresponding area-detection packet that includes the received TAG ID;*

*determining the location of each TAG, and its associated object, based on the identity of the receiver receiving the TAG transmissions for that TAG as represented by the area-detection packet provided by such receiver that received the TAG transmissions; and*

*wherein the receivers are coupled to the location processor by a local area network, with each receiver including a LAN interface, such that the TOA detection packets are communicated to the location processor over the LAN.*

*72. The transmitter of claim 56, wherein the motion status indication further indicates a fourth mode: No Motion.*

*73. The transmitter of claim 57, wherein the information transmitted by the transmitter circuitry includes an appropriate motion status indication.*

*74. The transmitter of claim 73, wherein the motion status indication indicates one of at least three modes: Motion Initiated, Motion Continuing, Motion Stopped.*

*75. The transmitter of claim 74, wherein the motion status indication further indicates a fourth mode: No Motion.*

* * * * *

US00RE36791C1

(12) EX PARTE REEXAMINATION CERTIFICATE (9044th)

United States Patent

Heller

(10) Number: US RE36,791 C1

(45) Certificate Issued: Jun. 5, 2012

(54) LOCATION SYSTEM ADAPTED FOR USE IN MULTIPATH ENVIRONMENTS

(75) Inventor: Alan C. Heller, San Antonio, TX (US)

(73) Assignee: Freshloc Technologies, Inc., Plano, TX (US)

Reexamination Request:
No. 90/009,920, Jun. 29, 2011

Reexamination Certificate for:

| | |
|---|---|
| Patent No.: | **Re. 36,791** |
| Issued: | **Jul. 25, 2000** |
| Appl. No.: | **08/252,842** |
| Filed: | **Jun. 2, 1994** |

Related U.S. Patent Documents

Reissue of:

| | |
|---|---|
| (64) Patent No.: | **5,119,104** |
| Issued: | **Jun. 2, 1992** |
| Appl. No.: | **07/518,802** |
| Filed: | **May 4, 1990** |

(51) Int. Cl.
*G01S 3/02* (2006.01)
*H04L 27/30* (2006.01)

(52) U.S. Cl. ..... 342/450; 342/463; 342/465; 375/132; 375/152; 380/34

(58) Field of Classification Search ..... None
See application file for complete search history.

(56) References Cited

To view the complete listing of prior art documents cited during the proceeding for Reexamination Control Number 90/009,920, please refer to the USPTO's public Patent Application Information Retrieval (PAIR) system under the Display References tab.

*Primary Examiner*—Jalatee Worjloh

(57) ABSTRACT

A radiolocation system for multipath environments, such as for tracking objects in a semiconductor fabrication facility (FIGS. 1a-1b), includes an array of receivers (20) distributed within the tracking area, coupled to a system processor (40) over a LAN. A TAG transmitter (30) located with each object transmits, at selected intervals, spread spectrum TAG transmissions including at least a unique TAG ID. In a high resolution embodiment, object location is accomplished by time-of-arrival (TOA) differentiation, with each receiver (FIG. 2b) including a TOA trigger circuit (64) for triggering on arrival of a TAG transmission, and a time base latching circuit (65) for latching the TOA count from an 800 MHz time base counter. In a low resolution embodiment, each receiver of the array is assigned a specific location-area, and receives TAG transmissions almost exclusively from TAGs located in that area, thereby eliminating the need for any time-of-arrival circuitry.

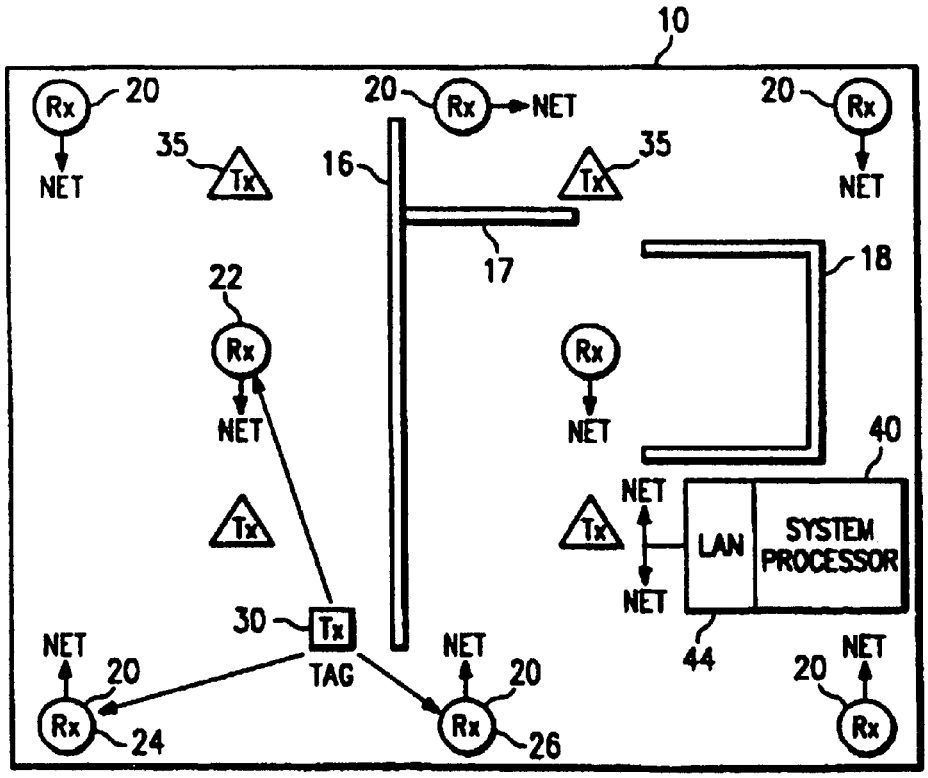

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claim 48 is cancelled.

Claims 1-47 and 49-75 were not reexamined.

* * * * *